United States Patent
He

(10) Patent No.: US 11,875,018 B2
(45) Date of Patent: Jan. 16, 2024

(54) DISPLAY MODULE AND ELECTRONIC DEVICE FOR DISPLAYING ICONS OF APPLICATIONS

(71) Applicant: VIVO MOBILE COMMUNICATION CO., LTD., Dongguan (CN)

(72) Inventor: Yanjun He, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/955,502

(22) Filed: Sep. 28, 2022

(65) Prior Publication Data
US 2023/0019170 A1   Jan. 19, 2023

Related U.S. Application Data

(63) Continuation of application No. PCT/CN2021/083584, filed on Mar. 29, 2021.

(30) Foreign Application Priority Data

Mar. 31, 2020   (CN) .......................... 202010247135.3

(51) Int. Cl.
G06F 3/01      (2006.01)
G06F 3/0482    (2013.01)
G06F 3/04845   (2022.01)

(52) U.S. Cl.
CPC ............ *G06F 3/0482* (2013.01); *G06F 3/017* (2013.01); *G06F 3/04845* (2013.01)

(58) Field of Classification Search
None
See application file for complete search history.

(56) References Cited

U.S. PATENT DOCUMENTS

2011/0115817 A1*  5/2011  Chun .................. G06F 3/04886
                                              715/764
2015/0058761 A1   2/2015  Cai et al.
(Continued)

FOREIGN PATENT DOCUMENTS

CN      102890593 A      1/2013
CN      104094210 A     10/2014
(Continued)

OTHER PUBLICATIONS

International Search Report issued in corresponding International Application No. PCT/CN2021/083584, dated Jun. 24, 2021, 6 pages.

(Continued)

*Primary Examiner* — Rinna Yi
(74) *Attorney, Agent, or Firm* — IPX PLLC

(57) ABSTRACT

A method includes: in a case that K icons are displayed, receiving a first input through which a user adjusts a tilt angle of an electronic device, where K is a positive integer; displaying N first icons in a target region according to the tilt angle of the electronic device in response to the first input, where the target region is any one of the following: a region in which a second icon in the K icons is located and a region in which a distance from the second icon in the K icons is less than or equal to a preset value, the N first icons are associated with the second icon, and N is a positive integer; receiving a second input performed on a target icon in the N first icons; and in response to the second input, displaying an interface of an application indicated by the target icon.

9 Claims, 17 Drawing Sheets

(56) References Cited

U.S. PATENT DOCUMENTS

| | | | | |
|---|---|---|---|---|
| 2016/0077708 A1* | 3/2016 | Han | ................... | G06F 3/04842 |
| | | | | 715/846 |
| 2016/0139748 A1* | 5/2016 | Iwaizumi | ............ | G06Q 10/107 |
| | | | | 715/838 |
| 2017/0060381 A1* | 3/2017 | Hanada | ................ | G06F 3/0482 |
| 2019/0026004 A1 | 1/2019 | Caen | | |

FOREIGN PATENT DOCUMENTS

| | | |
|---|---|---|
| CN | 104427122 A | 3/2015 |
| CN | 104571912 A | 4/2015 |
| CN | 105324745 A | 2/2016 |
| CN | 105630279 A | 6/2016 |
| CN | 106325696 A | 1/2017 |
| CN | 106445366 A | 2/2017 |
| CN | 110069181 A | 7/2019 |
| CN | 111475069 A | 7/2020 |
| EP | 2466437 A1 | 6/2012 |
| EP | 2629180 A2 | 8/2013 |
| EP | 3076275 A1 | 10/2016 |
| WO | 2015130137 A1 | 9/2015 |

OTHER PUBLICATIONS

First Office Action issued in related Chinese Application No. 202010247135.3 dated Jan. 4, 2021, 10 pages.
Extended European Search Report issued in related European Application No. 21782379.8, dated Sep. 12, 2023, 11 pages.

\* cited by examiner

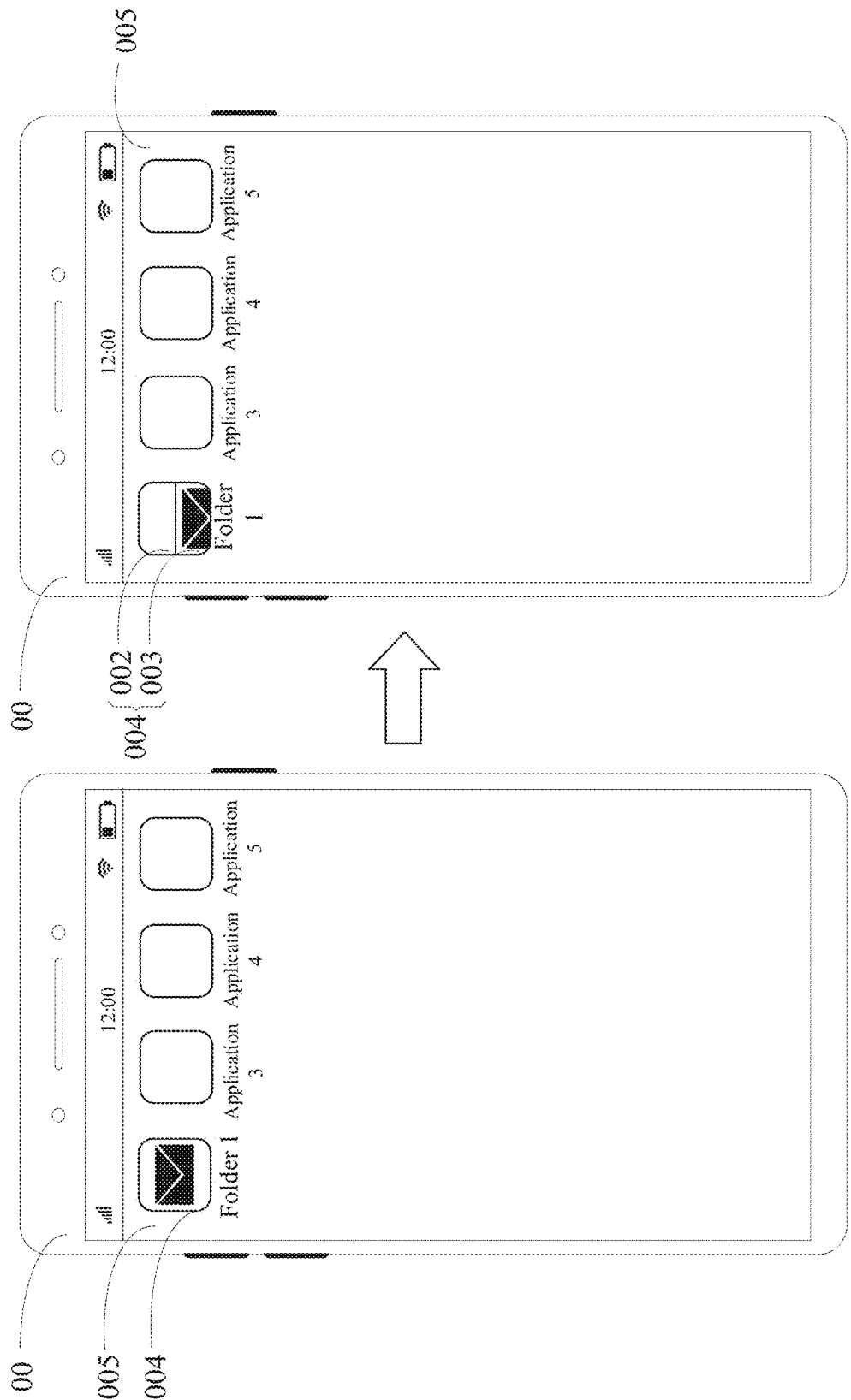

```
┌─────────────────────────────────────────────────────┐
│ In a case that K icons are displayed, an electronic │  Step
│ device receives a first input through which a user  │  101
│ adjusts a tilt angle of the electronic device       │
└─────────────────────────────────────────────────────┘
                          │
                          ▼
┌─────────────────────────────────────────────────────┐  Step
│ The electronic device obtains first position        │  105
│ information and second position information in      │
│ response to the first input                         │
└─────────────────────────────────────────────────────┘
                          │
                          ▼
┌─────────────────────────────────────────────────────┐  Step
│ The electronic device determines the tilt angle of  │  106
│ the electronic device according to the first        │
│ position information and the second position        │
│ information                                         │
└─────────────────────────────────────────────────────┘
                          │
                          ▼
┌─────────────────────────────────────────────────────┐  Step
│ The electronic device displays N first icons in a   │  102
│ target region according to the tilt angle of the    │
│ electronic device in response to the first input    │
└─────────────────────────────────────────────────────┘
                          │
                          ▼
┌─────────────────────────────────────────────────────┐  Step
│ The electronic device receives a second input       │  103
│ performed on a target icon in the N first icons     │
└─────────────────────────────────────────────────────┘
                          │
                          ▼
┌─────────────────────────────────────────────────────┐  Step
│ In response to the second input, the electronic     │  104
│ device displays an interface of an application      │
│ indicated by the target icon                        │
└─────────────────────────────────────────────────────┘
```

FIG. 7

DISPLAY MODULE AND ELECTRONIC DEVICE FOR DISPLAYING ICONS OF APPLICATIONS

CROSS-REFERENCE To RELATED APPLICATIONS

This application is a continuation of International Application No. PCT/CN2021/083584, filed on Mar. 29, 2021, which claims priority to Chinese Patent Application No. 202010247135.3, filed on Mar. 31, 2020. The entire contents of each of the above-identified applications are expressly incorporated herein by reference.

TECHNICAL FIELD

Embodiments of the present disclosure relate to the field of communications technologies, and in particular, to a display method and an electronic device.

BACKGROUND

As more and more applications are installed on an electronic device, more and more icons of applications are displayed on a desktop interface of the electronic device. A user may create a folder on the desktop interface of the electronic device to sort the icons of the applications. For example, the user may move some icons on the desktop interface of the electronic device to a folder, and the desktop interface of the electronic device displays only an icon of the folder.

Currently, the user may first find a folder including an icon of an application, and then trigger, through an input on the icon of the application in the folder, the electronic device to start the application. For example, if the user wants to start an application A, the user may find, in a plurality of folders displayed on the desktop interface of the electronic device, a first folder including an icon of the application A. The user may trigger, through an input on the first folder, the electronic device to display icons of all applications in the first folder. Then the user may find the icon of the application A from the icons of all the applications in the first folder, and trigger, through a touch and tap input on the icon of the application A, the electronic device to start the application. In this way, an operation process of starting an application in a folder may be relatively cumbersome.

SUMMARY

Embodiments of the present disclosure provide a display method and an electronic device.

The embodiments of the present disclosure are implemented as follows:

According to a first aspect, an embodiment of the present disclosure provides a display method, applied to an electronic device. The method includes: in a case that K icons are displayed, receiving a first input through which a user adjusts a tilt angle of an electronic device, where K is a positive integer; displaying N first icons in a target region according to the tilt angle of the electronic device in response to the first input, where the target region is any one of the following: a region in which a second icon in the K icons is located and a region in which a distance from the second icon in the K icons is less than or equal to a preset value, the N first icons are associated with the second icon, and N is a positive integer; receiving a second input performed on a target icon in the N first icons; and in response to the second input, displaying an interface of an application indicated by the target icon.

According to a second aspect, an embodiment of the present disclosure provides an electronic device. The electronic device includes a receiving module and a display module. The receiving module is configured to: in a case that K icons are displayed, receive a first input through which a user adjusts a tilt angle of an electronic device, where K is a positive integer; the display module is configured to display N first icons in a target region according to the tilt angle of the electronic device in response to the first input received by the receiving module, where the target region is any one of the following: a region in which a second icon in the K icons is located and a region in which a distance from the second icon in the K icons is less than or equal to a preset value, the N first icons are associated with the second icon, and N is a positive integer; the receiving module is further configured to receive a second input performed on a target icon in the N first icons; and the display module is further configured to: in response to the second input received by the receiving module, display an interface of an application indicated by the target icon.

According to a third aspect, an embodiment of the present disclosure provides an electronic device, including a processor, a memory, and a computer program that is stored in the memory and that can be run on the processor, and when the computer program is executed by the processor, the steps of the display method in the first aspect are implemented.

According to a fourth aspect, an embodiment of the present disclosure provides a computer-readable storage medium, where the computer-readable storage medium stores a computer program, and when the computer program is executed by a processor, the steps of the display method in the first aspect are implemented.

In the embodiments of the present disclosure, in a case that K icons (K is a positive integer) are displayed, an electronic device may receive a first input through which a user adjusts a tilt angle of the electronic device, and display N first icons in a target region according to the tilt angle of the electronic device in response to the first input, where the target region is any one of the following: a region in which a second icon in the K icons is located and a region in which a distance from the second icon in the K icons is less than or equal to a preset value, the N first icons are associated with the second icon, and N is a positive integer. A second input performed on a target icon in the N first icons is received, and an interface of an application indicated by the target icon is displayed in response to the second input.

BRIEF DESCRIPTION OF DRAWINGS

FIGS. 5A and 5B are first schematic diagrams of an operation of displaying N second icons in a target region by an electronic device according to an embodiment of the present disclosure;

FIG. 7 is a second schematic diagram of a display method according to an embodiment of the present disclosure;

DETAILED DESCRIPTION

Figures 1, 2:
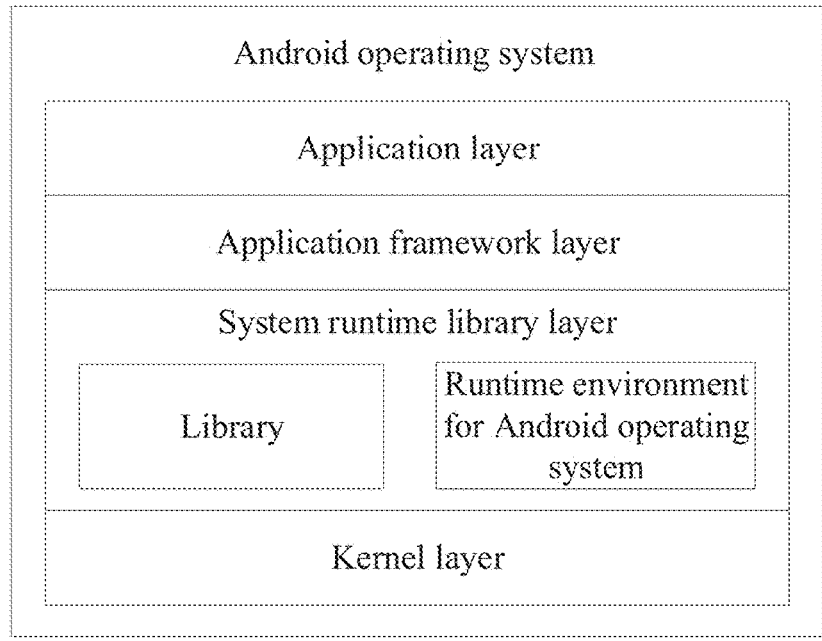
FIG. 1 is a schematic architectural diagram of an Android operating system according to an embodiment of the present disclosure.
FIG. 2 is a first schematic diagram of a display method according to an embodiment of the present disclosure.

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

It should be understood that in this specification, a term "and/or" is an associative relationship for describing associated objects, indicating that three relationships may exist, for example, A and/or B, which may indicate three situations: A exists independently; A and B exist simultaneously; and B exists independently. In this specification, a symbol "/" indicates an "or" relationship between associated objects, for example, A/B indicates A or B.

In the specification and claims of the present disclosure, the terms "first", "second", and. so on are intended to distinguish between different objects but do not describe a particular order of the objects. For example, a first input and a second input are intended to distinguish between different inputs, instead of describing a particular order of the inputs.

In the embodiments of the present disclosure, the word such as "example" or "for example" is used to represent giving an example, an illustration, or a description. Any embodiment or design scheme described as an "example" in the embodiments of the present disclosure should not be explained as being more preferred or having more advantages than another embodiment or design scheme. Exactly, use of the term "example" or "for example" is intended to present a concept in a specific manner.

In the descriptions of the embodiments of the present disclosure, unless otherwise stated, "a plurality of" means two or more, for example, a plurality of elements mean two or more elements.

The embodiments of the present disclosure provide a display method and an electronic device. In a case that K icons (K is a positive integer) are displayed, an electronic device may receive a first input through which a user adjusts a tilt angle of the electronic device, and display N first icons in a target region according to the tilt angle of the electronic device in response to the first input, where the target region is any one of the following: a region in which a second icon in the K icons is located and a region in which a distance from the second icon in the K icons is less than or equal to a preset value, the N first icons are associated with the second icon, and N is a positive integer. A second input performed on a target icon in the N first icons is received, and an interface of an application indicated by the target icon is displayed in response to the second input. According to this solution, if the user wants to start the application indicated by the target icon, the user may tilt the electronic device, so that the electronic device can display, according to the tilt angle of the electronic device, the N first icons associated with the second icon in the target region. Then the user may trigger, through an input performed on the target icon in the N first icons, the electronic device to display the interface of the application corresponding to the target icon. In this way, an operation process of searching for a target icon by the user may be simplified, thereby improving human-computer interaction performance.

The electronic device in the embodiments of the present disclosure may be an electronic device with an operating system. The operating system may be an Android operating system, an iOS operating system, or another possible operating system. This is not specifically limited in the embodiments of the present disclosure.

The following uses the Android operating system as an example to describe a software environment to which the display method provided in the embodiments of the present disclosure is applied.

As shown in FIG. 1, FIG. 1 is a schematic architectural diagram of an Android operating system according to an embodiment of the present disclosure. In FIG. 1, an architecture of the Android operating system includes four layers: an application layer, an application framework layer, a system runtime library layer, and a kernel layer (which may be, for example, a Linux kernel layer).

The application layer includes all applications in the Android operating system (including a system application and a third-party application).

The application framework layer is an application framework, and the developer may develop some applications based on the application framework layer when following a development rule of the application framework.

The system runtime library layer includes a library (also referred to as a system library) and an Android operating system runtime environment. The library mainly provides the Android operating system with various resources required by the Android operating system. The Android operating system runtime environment is used to provide the Android operating system with a software environment.

The kernel layer is an operating system layer of the Android operating system, and is a bottom-most layer in the Android operating system software layers. The kernel layer provides the Android operating system with a core system service and a hardware-related driver based on the Linux kernel.

The Android operating system is used as an example. In the embodiments of the present disclosure, a developer may develop, based on the system architecture of the Android operating system shown in FIG. 1, a software program to implement the display method provided in the embodiments of the present disclosure, so that the display method can run based on the Android operating system shown in FIG. 1. That is, a processor or an electronic device may run the software program in the Android operating system to implement the display method provided in the embodiments of the present disclosure.

The electronic device in the embodiments of the present disclosure may be a mobile electronic device, or may be a non-mobile electronic device. For example, the mobile electronic device may be a mobile phone, a tablet computer, a laptop computer, a palmtop computer, an in-vehicle electronic device, a wearable device, an Ultra-Mobile Personal Computer (UMPC), a netbook, or a Personal Digital Assistant (PDA). The non-mobile electronic device may be a Personal Computer (PC), a television (TV), an automated teller machine, or a self-service machine.

This is not specifically limited in the embodiments of the present disclosure.

The display method provided in the embodiments of the present disclosure may be performed by the foregoing electronic device, or a functional module and/or a functional entity that can implement the display method in the electronic device. In some embodiments, this may be determined according to an actual use requirement, and is not limited in the embodiments of the present disclosure.

It should be noted that, in the embodiments of the present disclosure, a second icon may be an icon of a folder or an application. When second icons are different, firsts icon associated with the second icons are also different. The following separately describes an application scenario of the first icon and the second icon by using an example.

Scenario 1: For example, a second icon is a folder, and N first icons are icons in the folder. In a case that an icon of a target folder is displayed in a region in which the second icon is located, a user may adjust a tilt angle of an electronic device by performing a rotation operation on the electronic device, and in response to the rotation operation (that is, a first input), the electronic device displays a plurality of icons (that is, the N first icons) in the target folder in the region in which the second icon is located. Then the user may tap the target icon in the plurality of icons, so that the electronic device may start, in response to the tap operation (that is, a second input), an application indicated by the target icon, and display a main interface of the target application.

Scenario 2: For example, a second icon is an icon of an application (for example, an icon of an application Q), and N first icons are icons of N sub-pages of the application. In a case that the icon of the application Q is displayed in a region in which the second icon is located, a user may adjust a tilt angle of an electronic device by performing a rotation operation on the electronic device, and in response to the rotation operation (that is, a first input), the electronic device displays icons (that is, the N first icons) of N sub-pages of the application Q in a region in which a distance from the first icon is less than or equal to a preset value. The user may tap an icon (that is, a target icon) of one of the N sub-pages of the application Q, and the electronic device may start the application Q in response to the tap operation (that is, a second input), and display an interface indicated by the icon of the sub-page.

The following describes the display method provided in the embodiments of the present disclosure with reference to FIG. 2 to FIG. 16B by using an example in which the method is performed by an electronic device.

As shown in FIG. 2, an embodiment of the present disclosure provides a display method. The method is applied to an electronic device. The method may include the following steps 101 to 104.

Step 101: In a case that K icons are displayed, the electronic device receives a first input through which a user adjusts a tilt angle of the electronic device.

K is a positive integer.

For example, in this embodiment of the present disclosure, the K icons may be at least one of the following: an icon of a folder, an icon of an application, and an icon of a sub-page of an application. The icon of the sub-page of the application is used to indicate one sub-page of the application.

For example, in this embodiment of the present disclosure, the first input may be used to adjust the tilt angle of the electronic device. In some embodiments, the first input may be at least one of the following:

a moving operation performed by the user on the electronic device, that is, the user translates the electronic device from one spatial position to another spatial position in a case that the tilt angle of the electronic device remains unchanged, where for example, an up/down translation is performed on the electronic device, or a left/right translation is performed on the electronic device.

a tilt operation performed by the user on the electronic device, that is, an operation through which the tilt angle of the electronic device is less than or equal to 180° in a case that a spatial position of a center point of the electronic device remains relatively unchanged, where for example, an operation through which a tilt angle of a screen of the electronic device relative to a horizontal reference plane is 20°; and a flip operation performed by the user on the electronic device, that is, an operation through which the tilt angle of the electronic device is greater than 180° and is less than or equal to 360° in a case that the spatial position of the center point of the electronic device remains relatively unchanged, where for example, an operation through which the tilt angle of the screen of the electronic device relative to the horizontal reference plane is 270°.

In some embodiments, the first input may be any other operation through which the tilt angle of the electronic device changes, or the like. In some embodiments, this may be determined according to an actual use requirement, and is not specifically limited in this embodiment of the present disclosure.

For example, assuming that the K icons are displayed on ae desktop interface of the electronic device, if the user changes the tilt angle of the electronic device by performing a flip operation on the electronic device, the flip operation may be the first input on the electronic device.

It should be noted that, generally, the electronic device may establish a relative coordinate system based on the electronic device by using an angular velocity sensor (for example, a gyroscope) installed inside the electronic device. Generally, the angular velocity sensor may be configured to periodically obtain a rotational angular velocity parameter of the electronic device. When the electronic device determines, by using the rotational angular velocity parameter, that the electronic device is tilted, the electronic device may determine an angle of deflection of a coordinate plane in the relative coordinate system relative to a corresponding plane of an inertial coordinate system as the tilt angle of the electronic device.

For example, a center point of the screen of the electronic device is used as an origin of the relative coordinate system, a normal direction of the screen of the electronic device is a $Z_1$-axis direction, and the screen of the electronic device is used as an $X_1OY_1$ plane to establish the relative coordinate system. It is assumed that before the electronic device is tilted, the $X_1OY_1$ plane of the screen of the electronic device is parallel to an XOY plane of the inertial coordinate system. When the electronic device is tilted, the electronic device calculates an included angle between the $X_1OY_1$ plane of the relative coordinate system and the XOY plane of the inertial coordinate system, and determines the included angle as the tilt angle of the electronic device.

Step 102: The electronic device displays N first icons in a target region according to the tilt angle of the electronic device in response to the first input.

The target region is any one of the following: a region in which a second icon in the K icons is located and a region in which a distance from the second icon in the K icons is less than or equal to a preset value, the N first icons are associated with the second icon, and N is a positive integer.

For example, in this embodiment of the present disclosure, the second icon is an icon of a target folder, and the N first icons are icons in the target folder; or the second icon is an icon of a target application, and each of the N first icons is used to indicate a sub-page in the target application.

For example, in this embodiment of the present disclosure, a target interface of the electronic device may include a plurality of icon placeholders. Each icon placeholder may display one icon (for example, an icon of a folder or an icon of an application). The electronic device may display icons of K programs in the plurality of icon placeholders on the target interface. A first icon placeholder may be one of the plurality of icon placeholders. The target interface may be any one of the following: a main interface of the electronic device, a minus one screen interface of the electronic device and an interface of the electronic device other than the main interface and the minus one screen interface. In some embodiments, this may be determined according to an actual use requirement, and is not specifically limited in this embodiment of the present disclosure.

For example, it is assumed that the main interface of the electronic device includes 24 icon placeholders, and the 24 icon placeholders may be arranged and displayed in six rows and four columns. It is assumed that the user determines an icon placeholder in the second row and the first column as the first icon placeholder. In a case that the icon placeholder (that is, the first icon placeholder) in the second row and the first column of the main interface of the electronic device displays the icon of the target folder (that is, the second icon), if the user wants to view an icon in the target folder, the user may adjust, through a flip operation on the electronic device (that is, the first input), the tilt angle of the electronic device to trigger the electronic device to display the icon in the target folder.

For example, in this embodiment of the present disclosure, the electronic device may determine the second icon from the K icons in any one of the following manners. Manner 1: The user may determine the second icon according to the tilt angle of the electronic device. In some embodiments, when the tilt angle of the electronic device is within a specific range, one preset angle corresponds to one icon in the K icons, and the electronic device may determine the icon corresponding to the preset angle as the second icon. Manner 2: The electronic device may receive a target input performed by the user, to determine the second icon. In some embodiments, the user may select the second icon from the K icons through the target input, and the electronic device may determine the second icon in response to the target input. Manner 3: The electronic device may determine, as the second icon, an icon displayed in the first icon placeholder. In some embodiments, a manner of determining the second icon in the present disclosure may be specified according to an actual use requirement, and is not specifically limited in this embodiment of the present disclosure.

For example, in this embodiment of the present disclosure, in a possible implementation, in a case that the second icon is the icon of the target folder, the N first icons may be icons in the target folder. In another possible implementation, in a case that the second icon is the icon of the target application, the N first icons are icons of sub-pages in the target application.

For example, in a case that the second icon is the icon of the target application, the N first icons may also be icons of applications of the same type as the target application. It can be understood that, in a case that the user performs an input (for example, a second input) on one of the N icons (that is, the first icons) of the applications of the same type as the target application, the electronic device may display, in response to the input, an interface of an application indicated by an icon of the received input.

For example, in this embodiment of the present disclosure, the tilt angle may be a rotation angle when the $X_1OY_1$ plane of the relative coordinate system of the electronic device rotates in a counterclockwise direction to be parallel to the XOY plane of the inertial coordinate system, and a value range of the tilt angle is [0°, 360°]. The tilt angle may also be a minimum rotation angle when the $X_1OY_1$ plane of the relative coordinate system of the electronic device rotates in a clockwise direction or a counterclockwise direction to be parallel to the XOY plane of the inertial coordinate system, and a value range of the tilt angle is [−180°, 180°]. It should be noted that in this embodiment of the present disclosure, an example in which the value range of the tilt angle is [0°, 360°] is used for description.

For example, in this embodiment of the present disclosure, that the N first icons are associated with the second icon means that second icons of different types correspond to different N first icons, and content indicated by the second icon and content indicated by the N first icons include an inclusive relationship or a hierarchical relationship. A type of the second icon may include an icon type of a folder and an icon type of an application. In some embodiments, in a scenario, if the second icon is an icon of a folder, the N first icons are icons in a folder indicated by the second icon, that is, there is an inclusive relationship between the folder indicated by the second icon and applications indicated by the N first icons. In another scenario, if the second icon is an icon of an application, the N first icons are icons of sub-pages in the application, that is, there is a hierarchical relationship between the application indicated by the second icon and the sub-pages of the applications indicated by the N first icons. In some embodiments, this may be determined according to an actual use requirement, and is not specifically limited in this embodiment of the present disclosure.

For example, in this embodiment of the present disclosure, when the second icon is the icon of the target folder, before the K icons are displayed, the display method provided in this embodiment of the present disclosure may further include: receiving an input performed by the user, to create the target folder. In some embodiments, this may be implemented in any one of two manners. In a first manner, in a case that icons of at least two applications are displayed on the desktop interface of the electronic device, the user may perform an input on an icon of a first application to trigger establishment of an association relationship between the icon of the first application and an icon of a second application, and the electronic device may create, in response to the input performed by the user, the target folder including the icon of the first application and the icon of the second application. In another manner, the electronic device may receive an input performed by the user, and create an empty target folder on the desktop interface of the electronic device, and through an input on a part of other icons displayed on the desktop interface of the electronic device, the user may add the part of icons to the target folder. In some embodiments, this may be determined according to an actual use requirement, and is not specifically limited in this embodiment of the present disclosure.

It should be noted that in this embodiment of the present disclosure, in a process in which the electronic device receives the input performed by the user and creates the target folder, the display method provided in this embodiment of the present disclosure is still applicable, that is, in the process of creating the target folder, the electronic device may display at least one icon in the target folder in the target region according to the tilt angle of the electronic device.

For example, in this embodiment of the present disclosure, in a case that the tilt angle of the electronic device is zero degrees, that is, the $X_1OY_1$ plane of the electronic device is parallel to the XOY plane of the inertial coordinate system, if the second icon is the icon of the target folder, the icon of the target folder and a cover icon of the target folder are displayed in the region in which the second icon is located, where the cover icon of the target folder is an icon in the target folder; or if the second icon is the icon of the target application, the icon of the target application is displayed in the region in which the second icon is located, In a case that the tilt angle of the electronic device is a non-zero degree, the electronic device may display the N first icons in the target region according to the tilt angle of the electronic device. In some embodiments, this may be determined according to an actual use requirement, and is not specifically limited in this embodiment of the present disclosure.

For example, in this embodiment of the present disclosure, the cover icon of the target folder may be determined in the following two manners: In a first determining manner, the user may set any icon included in the target folder as the cover icon of the target folder. In a second determining manner, the electronic device may sort icons in the target folder according to a preset sorting rule, and determine an icon with the highest order as the cover icon of the target folder, where the preset sorting rule may be any one of the following: sorting according to a use frequency of the user, sorting according to use duration of the user, sorting according to a priority identifier set by the user, and the like. In some embodiments, this may be determined according to an actual use requirement, and is not specifically limited in this embodiment of the present disclosure.

Figures 3A, 3B:
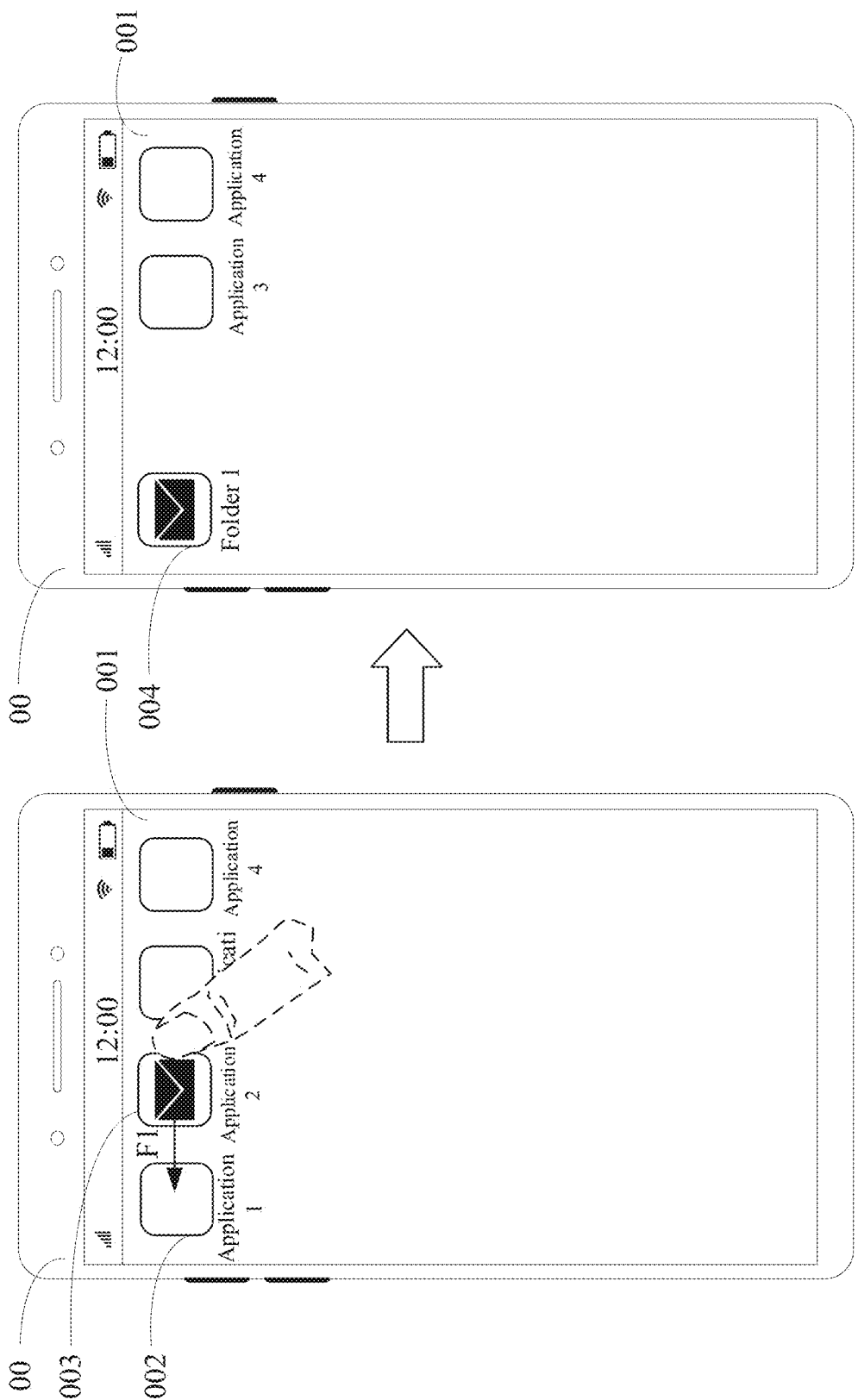
FIGS. 3A and 3B are first schematic diagrams of an operation of creating a target folder by an electronic device according to an embodiment of the present disclosure.

For example, FIGS. 3A and 3B are schematic diagrams of an operation of creating the target folder in a case that the tilt angle is zero degrees. As shown in FIG. 3A, icons of four applications: an icon 002 of an application 1, an icon 003 of an application 2, an icon of an application 3, and an icon of an application 4 are displayed on a desktop interface 001 of an electronic device 00. If the user presses the icon 003 of the application 2 for a long time and drags the icon 003 of the application 2 to a position of the icon 002 of the application 1 in an F1 direction, as shown in FIG. 3B, the electronic device 00 may create and display an icon 004 of a "folder 1" at the position of the icon 002 of the application 1 in response to the long-press and drag input. The folder 1 includes the icon of the application 1 and the icon of the application 2. The electronic device 00 may further set the icon of the application 2 with a higher use frequency as a cover icon of the folder 1 according to a use frequency of the application 1 and a use frequency of the application 2.

Figures 4A, 4B:
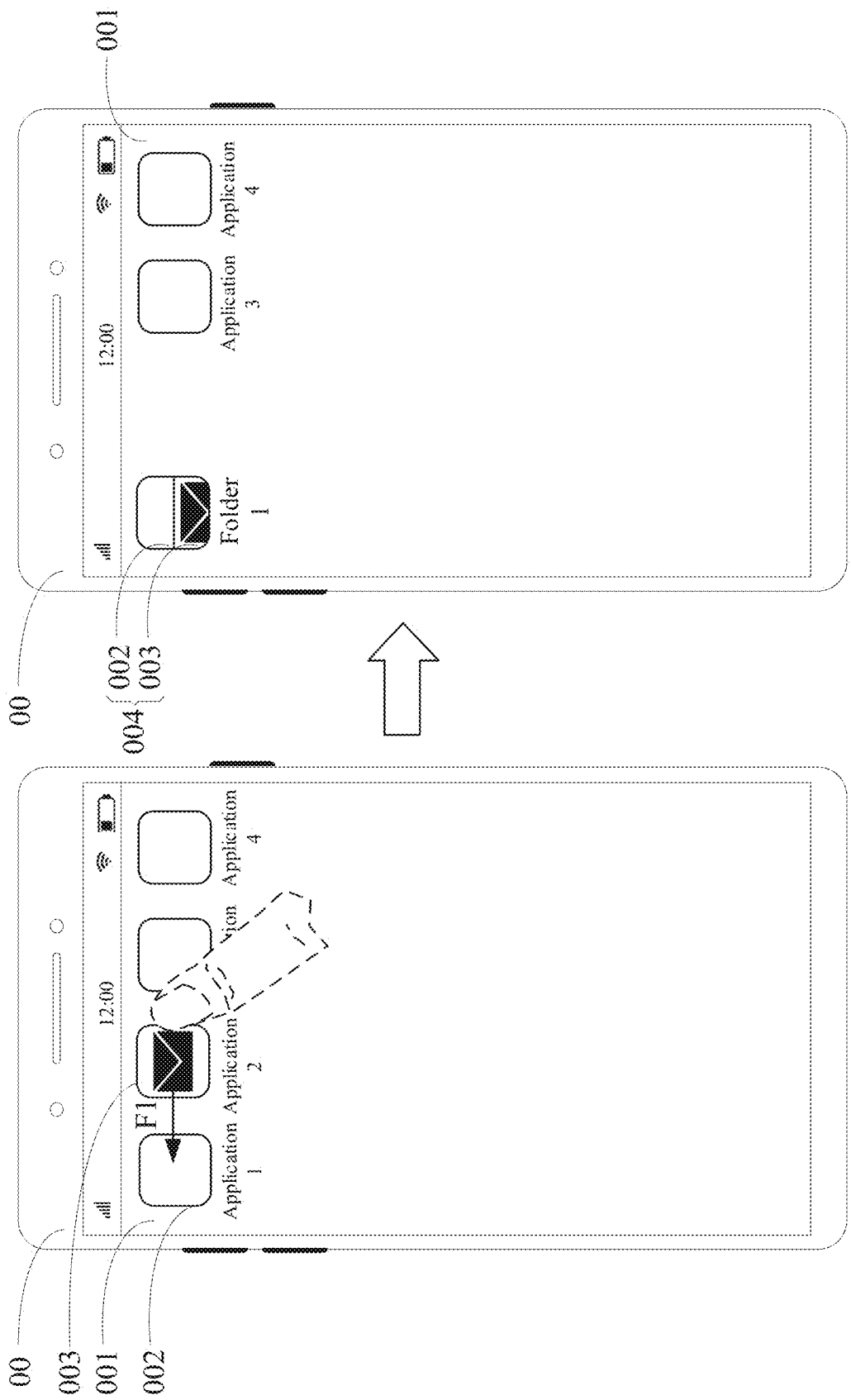
FIGS. 4A and 4B are second schematic diagrams of an operation of creating a target folder by an electronic device according to an embodiment of the present disclosure.

For example, FIGS. 4A and 4B are schematic diagrams of an operation of creating the target folder in a case that the tilt angle is 45°. As shown in FIG. 4A, icons of four applications: an icon 002 of an application 1, an icon 003 of an application 2, an icon of an application 3, and an icon of an application 4 are displayed on a desktop interface 001 of an electronic device 00. If the user presses the icon 003 of the application 2 for a long time and drags the icon 003 to the icon 002 of the application 1 in an F1 direction, as shown in FIG. 4B, the electronic device 00 may create an icon 004 of a "folder 1" at a position of the icon 002 of the application 1 in response to the long-press and drag input. The folder 1 includes the icon 002 of the application 1 and the icon 003 of the application 2. The electronic device 00 may display the icon 002. of the application 1 in an upper half of the icon 004 of the folder 1 according to the tilt angle of the electronic device 00, and display the icon 003 of the application 2 in a lower half of the icon 004 of the folder.

For example, in this embodiment of the present disclosure, the target region may be the region in which the second icon in the K icons is located (for example, a region of an icon placeholder in which the second icon is located), or the target region may be the region in which the distance from the second icon in the K icons (that is, a distance from a center point of the second icon) is less than or equal to the preset value. The distance from the center point of the second icon is a distance from a coordinate point on the screen to the center point of the second icon. The region in which the distance from the center point of the second icon is less than or equal to the preset value may be a circular region with the center point of the second icon as a center and the preset value as a radius, or may be a part of the circular region (for example, a sector region, a toroid region, or a doroid region). The preset value may be, for example, set according to a size of the screen of the electronic device, a quantity of first icons, a use habit of the user, and the like. In some embodiments, this may be determined according to an actual use requirement, and is not specifically limited in this embodiment of the present disclosure.

For example, FIGS. 5A and 5B are first schematic diagrams of an operation of displaying the N first icons in the target region. As shown in FIG. 5A, in a case that the tilt angle of the electronic device 00 is zero degrees (that is, the $X_1OY_1$ plane of the electronic device is parallel to the XOY plane of the inertial coordinate system), four icons: a "folder 1", an "application 3", an "application 4", and an "application 5" are displayed on a desktop interface 005 of an electronic device 00. The folder 1 includes an icon of the application 1 and an icon of the application 2 (that is, two first icons), and a cover icon of the folder 1 is the icon of the application 2. If the user adjusts the tilt angle of the electronic device 00 to 45° (that is, an included angle between the $X_1OY_1$ plane of the electronic device and the XOY plane of the inertial coordinate system is 45°, as shown in FIG. 5B, the electronic device 00 may display, according to the tilt angle of the electronic device 00 in response to an input of adjusting the tilt angle of the electronic device (that is, a first input), the icon of the application 1 and the icon of the application 2 in a region in which an icon 004 of the "folder 1" is located (that is, a target region). In some embodiments, an icon 002 of the application 1 is displayed in an upper half of the region in which the icon 004 of the "folder 1" is located, and an icon 003 of the application 2 is displayed in a lower half of the region in which the icon 004 of the "folder 1" is located.

Figure 6B:
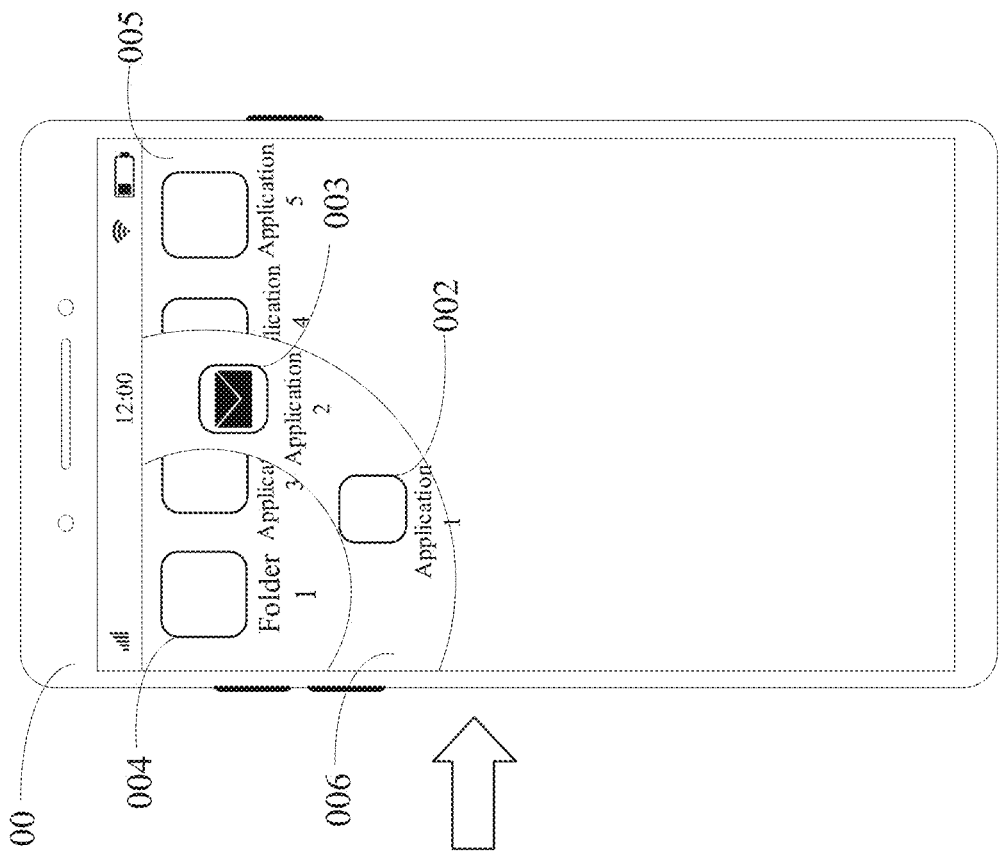
FIGS. 6A and 6B are second schematic diagrams of an operation of displaying N second icons in a target region by an electronic device according to an embodiment of the present disclosure.
Figure 6A:
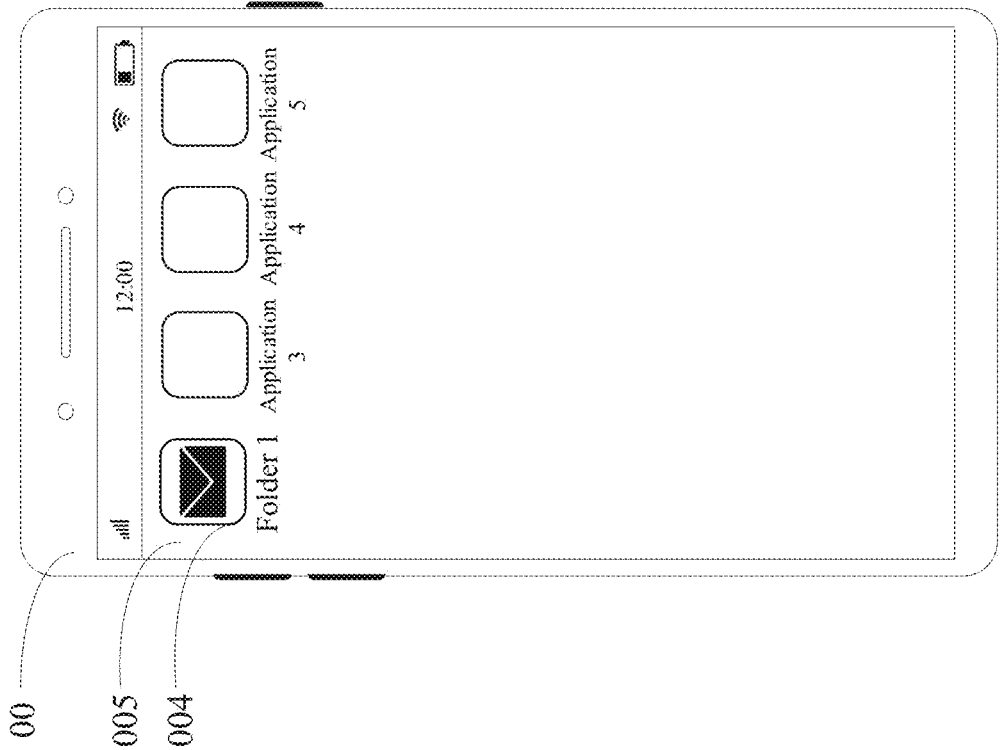

For example, FIGS. 6A and 6B are second schematic diagrams of an operation of displaying the N first icons in the target region. As shown in FIG. 6A, in a case that the tilt angle of the electronic device 00 is zero degrees (that is, the $X_1OY_1$ plane of the electronic device is parallel to the XOY plane of the inertial coordinate system), four icons: a "folder 1", an "application 3", an "application 4", and an "application 5" are displayed on a desktop interface 005 of an electronic device 00. The folder 1 includes an icon of the application 1 and an icon of the application 2, and a cover icon of the folder 1 is the icon of the application 2. If the user adjusts the tilt angle of the electronic device 00 to 60° (that is, an included angle between the $X_1OY_1$ plane of the electronic device and the XOY plane of the inertial coordinate system is 60°), as shown in FIG. 6B, the electronic device 00 may display, according to the tilt angle of the electronic device 00 in response to an input of adjusting the tilt angle of the electronic device (that is, a first input), a doroid control 006 (that is, a doroid region is a target region) in a floating manner with a center point of an icon 004 of the folder 1 as center and a preset value as a radius, and display an icon 002 of the application 1 and an icon 003 of the application 3 (that is, two first icons) on the control 006.

For example, after the electronic device receives the first input through which the user adjusts the tilt angle of the electronic device, the electronic device may determine the tilt angle of the electronic device according to a position of the electronic device at a start moment of the first input and a position of the electronic device at an end moment of the first input.

For example, with reference to FIG. 2, as shown in FIG. 7, before the "displaying N first icons in a target region according to the tilt angle of the electronic device" in step 102, the display method provided in this embodiment of the present disclosure further includes the following step 105 and step 106.

Step 105: The electronic device obtains first position information and second position information.

The first position information may be used to indicate the position of the electronic device at the end moment of the first input, and the second position information may be used to indicate the position of the electronic device at the start moment of the first input, or is used to indicate a horizontal reference plane.

It should be noted that, in this embodiment of the present disclosure, the horizontal reference plane is to a gravity field equipotential plane parallel to a geoid. In some embodiments, the horizontal reference plane may be a plane parallel to an XOY plane of an inertial space system and passing through a point (0,0,z), where z represents a height of the horizontal reference plane relative to the geoid in a vertical direction. For example, assuming that a ground at the foot of the user is parallel to the geoid, the horizontal reference plane may be the ground at the foot of the user, or may be a plane parallel to the geoid and passing through the center point of the screen of the electronic device.

For example, in this embodiment of the present disclosure, the electronic device may obtain position information in any one of the following two manners. Manner A: The electronic device may periodically obtain position information of the electronic device. The user may adjust an obtaining period of the electronic device, and in a case that the obtaining period is relatively short, obtain the first position information and the second position information. Manner B: The electronic device may obtain position information in response to an operation of the user. For example, the electronic device may obtain the first position information when the first input starts, and the electronic device may obtain the second position information when the first input ends. In some embodiments, this may be determined according to an actual use requirement, and is not specifically limited in this embodiment of the present disclosure.

For example, in this embodiment of the present disclosure, the first position information may be coordinate information, angle information, angular velocity information, or the like of the electronic device in the inertial space at the end moment of the first input. The second position information may be coordinate information, angle information, angular velocity information, or the like of the electronic device in the inertial space at the start moment of the first input, or the second position information may represent coordinate information of the horizontal reference plane in the inertial space. In some embodiments, this may be determined according to an actual use requirement, and is not specifically limited in this embodiment of the present disclosure.

For example, in this embodiment of the present disclosure, the electronic device may measure position information of the electronic device by using an angular velocity sensor installed inside the electronic device. In some embodiments, the angular velocity sensor may be a gyroscope. According to a working principle of the gyroscope, the gyroscope may be any one of the following: a mechanical rotor gyroscope, a vibration gyroscope, an optical gyroscope, and the like. In some embodiments, this may be determined according to an actual use requirement, and is not specifically limited in this embodiment of the present disclosure.

It should be noted that in this embodiment of the present disclosure, a micro electromechanical gyroscope (Micro ElectroMechanical Systems (MEMS), also referred to as a microelectronic system) is used as an example for description. The micro electromechanical gyroscope uses a Coriolis force of physics to detect a small capacitance change in a rotation process of the micro electromechanical gyroscope, and further calculates an angular velocity of the micro electromechanical gyroscope by measuring a capacitance value.

For example, it is assumed that a micro electromechanical gyroscope is installed inside the electronic device. If the user adjusts the electronic device from a position A to a position B through the first input, the electronic device may obtain the angular velocity information of the electronic device at the start moment of the first input (that is, angular velocity information of the electronic device at the position A) by measuring an internal capacitance change of the micro electromechanical gyroscope at the start moment of the first input. The electronic device may also measure an internal capacitance change of the micro electromechanical gyroscope at the end moment of the first input, to obtain the angular velocity information of the electronic device at the end moment of the first input (that is, angular velocity information of the electronic device at the position B) by measuring a capacitance.

Step 106: The electronic device determines the tilt angle of the electronic device according to the first position information and the second position information.

For example, in this embodiment of the present disclosure, the electronic device may determine the tilt angle of the electronic device according to the first position information and the second position information in any one of the following manners: Manner 1: Determining a variation of the angle of the electronic device according to position information of the electronic device at the end moment of the first input (that is, the first position information) and position information of the electronic device at the start moment of the first input (that is, the second position information), and then determining the tilt angle of the electronic device according to the variation of the angle. Manner 2: Directly determining a tilt angle of the electronic device relative to the horizontal reference plane at the end moment of the first input according to position information of the electronic device at the end moment of the first input (that is, the first position information) and the coordinate information of the horizontal reference plane in the inertial space (that is, the second position information), that is, the tilt angle of the electronic device. In some embodiments, the method for determining the tilt angle of the electronic device may be determined according to an actual use situation, and is not specifically limited in this embodiment of the present disclosure.

It can be understood that, in this embodiment of the present disclosure, the electronic device may determine the tilt angle of the electronic device according to the position information of the electronic device at the start moment of the first input and the position information of the electronic device at the end moment of the first input; or the electronic device may determine the tilt angle of the electronic device according to the position information of the electronic device at the end of the first input and position information of the horizontal reference plane. In this way, the electronic device may determine the tilt angle of the electronic device according to position information of the electronic device at different moments, so that the user can accurately operate the electronic device.

For example, after the electronic device receives the first input through which the user adjusts the tilt angle of the electronic device, the electronic device may determine that the tilt angle of the electronic device is within an angle interval in a plurality of intervals, and determine a display parameter corresponding to the angle interval (that is, a target angle interval) to which the tilt angle belongs as display parameters for displaying the N first icons by the electronic device.

Figure 8:
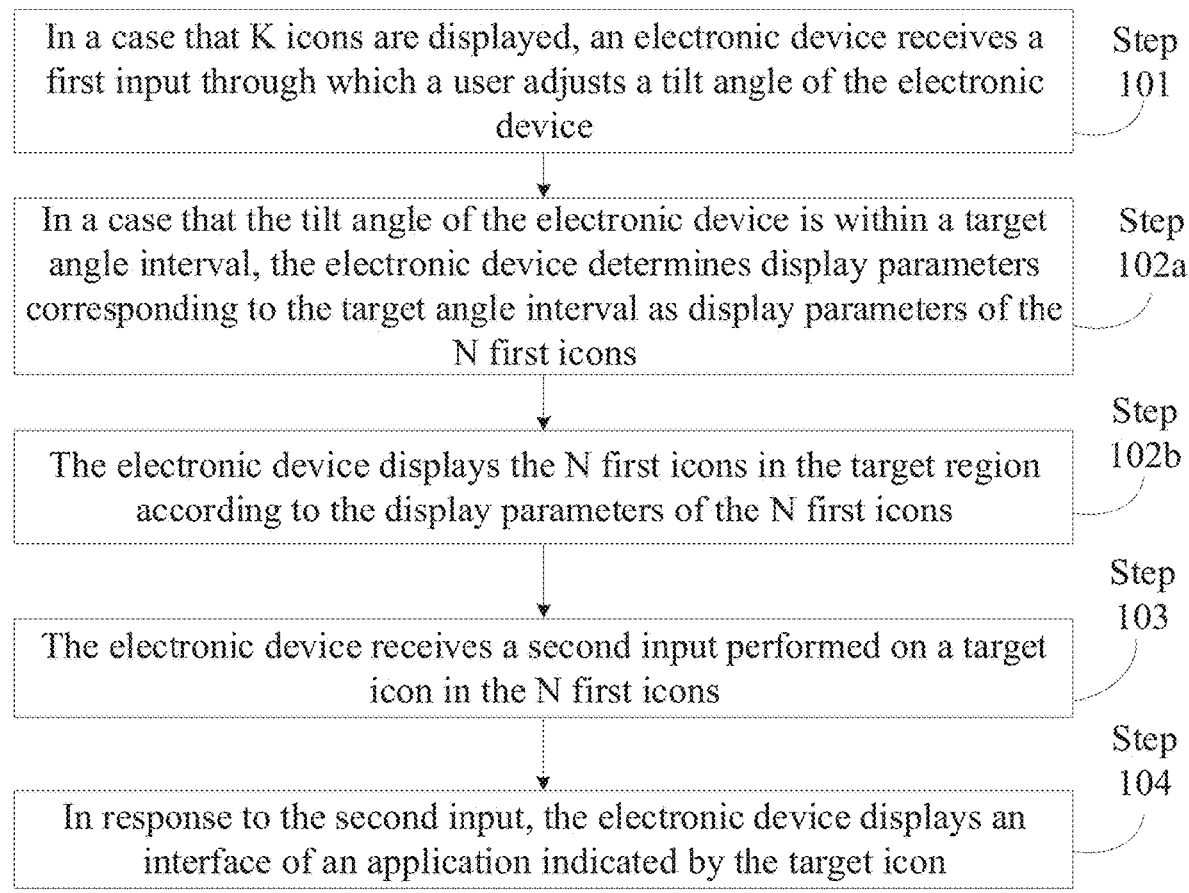
FIG. 8 is a third schematic diagram of a display method according to an embodiment of the present disclosure.

For example, with reference to FIG. 2, as shown in FIG. 8, the "displaying N first icons in a target region according to the tilt angle of the electronic device" in step 102 may be implemented by using the following step 102a and step 102b.

Step 102a: In a case that the tilt angle of the electronic device is within a target angle interval, the electronic device determines display parameters corresponding to the target angle interval as display parameters of the N first icons.

For example, in this embodiment of the present disclosure, a plurality of angle intervals of the electronic device divided according to a preset parameter may be included, and the target angle interval may be one of the plurality of angle intervals. The preset parameter may include at least one of the following: a start angle of the electronic device, an end angle of the electronic device, a step length of each angle interval, and the like. It should be noted that step sizes of angle intervals may be equal, or may not be equal. In some embodiments, angle intervals may be divided according to an actual use requirement and a user use habit, and this is not specifically limited in this embodiment of the present disclosure.

For example, it is assumed that a value range of the tilt angle of the electronic device is [0°, 180], that is, a start angle of the electronic device is 0° and an end angle of the electronic device is 180°. If step sizes of angle intervals of the electronic device are equal, and the step sizes are 45°, the electronic device may successively divide the tilt angle into four angle intervals: a first interval [0°, 45°), a second interval [45°, 90°), a third interval [90°, 135°), and a fourth interval [135°, 180°]. If the user sets a first step size as 90° and a second step size as 20°, the electronic device may successively divide the tilt angle into three angle intervals according to the step sizes set by the user: an interval 1 [0°, 90°), an interval 2 [90°, 110°), and an interval3 [110°, 180°].

For example, in this embodiment of the present disclosure, each of the plurality of angle intervals corresponds to one group of display parameters. Each angle interval may correspond to one group of display parameters according to a function relationship, or may correspond to one group of display parameters according to a correspondence list of the angle interval and the display parameters, or may correspond to one group of display parameters according to another correspondence rule. One group of display parameters corresponding to each angle interval may include any one of the following: an arrangement pattern of each icon in the region in which the second icon is located, a proportion of each icon in the region in which the second icon is located, a position of each icon in a region in which a distance from the second icon is less than or equal to a preset value, and a display proportion of each icon in the region in which the distance from the second icon is less than or equal to the preset value. In some embodiments, this may be determined according to an actual use requirement, and is not specifically limited in this embodiment of the present disclosure.

Step 102b: The electronic device displays the N first icons in the target region according to the display parameters of the N first icons.

The display parameters of the N first icons include at least any one of an arrangement pattern of each first icon in the region in which the second icon is located, a proportion of each first icon in the region in which the second icon is located, a position of each first icon in a region in which a distance from the second icon is less than or equal to a preset value, and a display proportion of each first icon in the region in which the distance from the second icon is less than or equal to the preset value.

For example, in this embodiment of the present disclosure, in the following embodiment, the display parameters of the N first icons are displayed in detail in two scenarios in which the target region is the region in which the second icon is located or the region in which the distance from the second icon is less than or equal to the preset value.

Scenario 1

For example, in this embodiment of the present disclosure, in a case that the target region is the region in which the second icon is located, the display parameters of the N first icons are the arrangement pattern of each first icon in the region in which the second icon is located and the proportion of each first icon in the region in which the second icon is located.

For example, in this embodiment of the present disclosure, the arrangement pattern of each first icon in the region in which the second icon is located is a layout of the first icon in the region in which the second icon is located. In some embodiments, the arrangement pattern of each first icon in the region in which the second icon is located may include an arrangement direction of the first icon in the region in which the second icon is located, an arrangement order of the first icon in the region in which the second icon is located, and the like. The arrangement direction of the first icon in the region in which the second icon is located is a direction from the first icon displayed in the region in which the second icon is located to a next first icon. For example, the arrangement direction of the first icon in the region in which the second icon is located may be from top to bottom, from bottom to top, from left to right, or from right to left. The arrangement order of the first icon in the second icon is a sequence between first icons when the first icon is arranged in a specific direction in the region in which the second icon is located. For example, the arrangement order of the first icon in the region in which the second icon is located may be a top-middle-bottom order, or may be a left-middle-right order.

It should be noted that the "top", "bottom", "left", and "right" directions in this embodiment of the present disclosure are directions relative to the user when the screen of the electronic device faces the user. It can be understood that the foregoing "top", "bottom", "left", and "right" directions are all enumerations as examples. In actual implementation, there may be any other possible direction. In some embodiments, this may be determined according to an actual use requirement, and is not limited in this embodiment of the present disclosure.

For example, in this embodiment of the present disclosure, the proportion of each first icon in the region in which the second icon is located is a ratio of each displayed first icon accounting for an area of the region in which the second icon is located. Generally, a percentage may be used for description. For example, it is assumed that the area of the region in which the second icon is located is 1. If the electronic device displays two first icons in the region in which the second icon is located: a first icon A and a first icon B, where the first icon A accounts for 0.7 of the area of the region in which the second icon is located, and the second icon B accounts for 0.3 of the area of the region in which the second icon is located, the first icon A accounts for 70% of the region in which the second icon is located, and the second icon B accounts for 30% of the region in which the second icon is located.

Figure 9A:
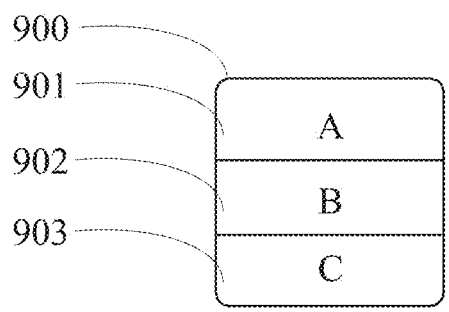
FIGS. 9A-9D are schematic diagrams of an arrangement pattern of a first icon in a region in which a second icon is located according to an embodiment of the present disclosure.
Figure 9B:
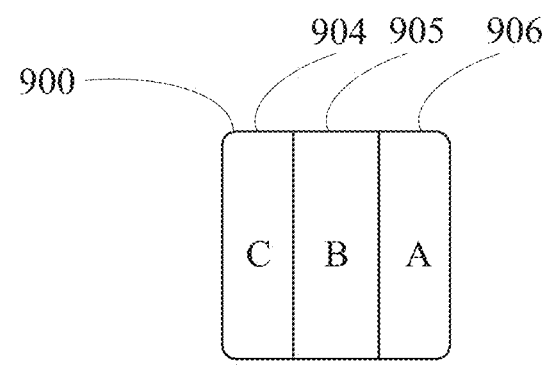
Figure 9C:
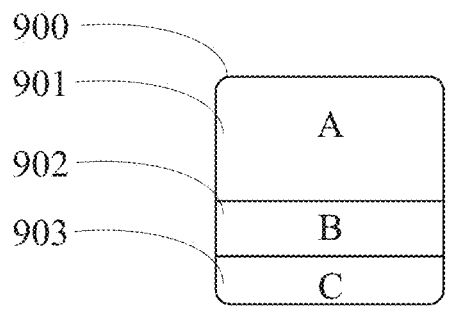
Figure 9D:
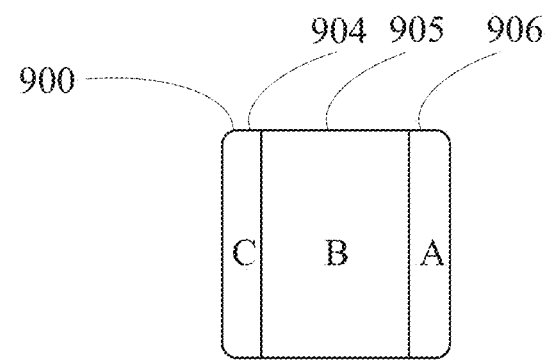

For example, FIGS. 9A-9D are schematic diagrams of the arrangement pattern of the first icon in the region in which the second icon is located. It is assumed that a region 900 in which the second icon is located is a region on the desktop interface of the electronic device, three first icons are arranged in the region 900 in which the second icon is located, and the three first icons are respectively a first icon A, a first icon B, and a first icon C As shown in FIG. 9A, the three first icons may be arranged in an alphabetical order from top to bottom, that is, the first icon A is displayed in a region 901, the first icon B is displayed in a region 902, and the first icon C is displayed in a region 903 from top to bottom. As shown in FIG. 9B, the three first icons may be arranged in an alphabetical order from left to right, that is, the first icon C is displayed in a region 904, the first icon B is displayed in a region 905, and the first icon A is displayed in a region 906 from left to right. The electronic device may further adjust a proportion of each first icon in the region 900 in which the second icon is located. As shown in FIG. 9C, the region 901 accounts for 50% of an area of the region 900 in which the second icon is located (that is, the first icon A accounts for 50% of the region in which the second icon is located), the region 902 accounts for 25% of the area of the region 900 in which the second icon is located (that is, the first icon B accounts for 25% of the region in which the second icon is located), and the region 903 accounts for 25% of the area of the region 900 in which the second icon is located (that is, the first icon C accounts for 25% of the region in which the second icon is located). As shown in FIG. 9D, the first icon A accounts for 15% of the region in which the second icon is located, the first icon B accounts for 70% of the region in which the second icon is located, and the first icon C accounts for 15% of the region in which the second icon is located.

Scenario 2

For example, in this embodiment of the present disclosure, in a case that the target region is the region in which the distance from the second icon is less than or equal to the preset value, the display parameters of the N first icons are the position of each first icon in the region in which the distance from the second icon is less than or equal to the preset value and the display proportion of each first icon in the region in which the distance from the second icon is less than or equal to the preset value.

For example, in this embodiment of the present disclosure, the position of each first icon in the region in which the distance from the second icon is less than or equal to the preset value is a position of a center point of each first icon in the region in which the distance from the second icon is less than or equal to the preset value. In some embodiments, if a region that is on the screen of the electronic device and in which a distance from the second icon is less than or equal to the preset value is a circular region or a part of the circular region (for example, a sector region, a toroid region, or a doroid region), the position of each first icon in the region in which the distance from the second icon is less than or equal to the preset value may be a position of each first icon in the circular region or the part of the circular region. In some embodiments, this may be determined according to an actual use requirement, and is not specifically limited in this embodiment of the present disclosure.

For example, in this embodiment of the present disclosure, the display proportion of each first icon in the region in which the distance from the second icon is less than or equal to the preset value is a ratio of a size of the first icon displayed in the region in which the distance from the second icon is less than or equal to the preset value to a preset icon size of the electronic device. The display proportion may be used to adjust a display size of the first icon. For example, it is assumed that a preset icon display proportion of the electronic device is 1, that is, an icon on the electronic device is displayed according to a preset size 1:1. If the display proportion of the first icon in the region in which the distance from the second icon is less than or equal to the preset value is 1.5, the first icon is displayed in the region in which the distance from the second icon is less than or equal to the preset value by using 1:1.5, that is, the first icon is enlarged by 1.5 times for display. In some embodiments, this may be determined according to an actual use requirement, and is not specifically limited in this embodiment of the present disclosure.

For example, as shown in FIG. 6B, a position of an icon 004 of a folder 1 is the region in which the second icon is located, and the electronic device 00 displays a doroid control 006 (that is, a region of the doroid control is the region in which the distance from the second icon is less than or equal to the preset value) in a floating manner with a center point of the icon of the folder I as a center and a preset value as a radium, displays an icon 002 of an application 1 at a first position of the control 006 (that is, a position of the icon 002 in the region in which the distance from the second icon is less than or equal to the preset value), and displays an icon 003 of an application 3 at a second position (that is, a position of the icon 003 in the region in which the distance from the second icon is less than or equal to the preset value). Display proportions of the icon 002 and the icon 003 are 0.7, that is, the icon 002 and the icon 003 are scaled down for display by using the display proportion 0.7.

It can be understood that, in this embodiment of the present disclosure, the electronic device may determine, according to the target angle interval to which the tilt angle of the electronic device belongs, the display parameters corresponding to the angle interval as the display parameters of the N first icons. Therefore, the electronic device may display the N first icons in the target region according to the display parameters of the N first icons. In this way, the user may adjust the tilt angle of the electronic device according to a requirement of the user, to control a display manner in which the electronic device displays the N first icons in the target region.

Step 103: The electronic device receives a second input performed on a target icon in the N first icons.

It should be noted that, in this embodiment of the present disclosure, the user may trigger, through the first input, the electronic device to display the N first icons in the target region, where the N first icons include a to-be-operated target icon of the user.

For example, in this embodiment of the present disclosure, the second input may be a touch input, a voice input, or a specific gesture input on the target icon. The touch input may be a tap input, a slide input, a double-tap input, or a long-press input on the target icon. The specific gesture input may be a preset gesture such as a pressure recognition gesture, a long press gesture, or an area change gesture (for example, the specific gesture may be a preset "OK" gesture). In some embodiments, the second input may be determined according to an actual use requirement, and is not specifically limited in this embodiment of the present disclosure.

Step 104: In response to the second input, the electronic device displays an interface of an application indicated by the target icon.

It should be noted that in this embodiment of the present disclosure, in a case that the second icon is a folder, the target icon may be an icon of an application in the folder indicated by the second icon. In some embodiments, in a case that the second icon is an icon of an application, the target icon may be an icon of a sub-page in the application indicated by the second icon.

For example, in this embodiment of the present disclosure, in the following embodiment, display of the interface of the application indicated by the target icon is described by using an example in two scenarios in which the target icon is an icon of an application in the folder indicated by the second icon or an icon of a sub-page in the application indicated by the second icon.

Scenario 1

For example, in this embodiment of the present disclosure, in a case that the second icon is a folder, the target icon may be an icon of an application in the folder indicated by the second. icon. In some embodiments, in a case that the target folder is displayed in the region in which the second icon is located, the user may adjust the tilt angle of the electronic device through the first input, and the electronic device may display the N first icons in the target folder in the target region in response to the first input according to the tilt angle of the electronic device. The electronic device may further receive the second input performed on the target icon in the N first icons, and display, in response to the second input, a main interface of the application indicated by the target icon.

Figure 10A:
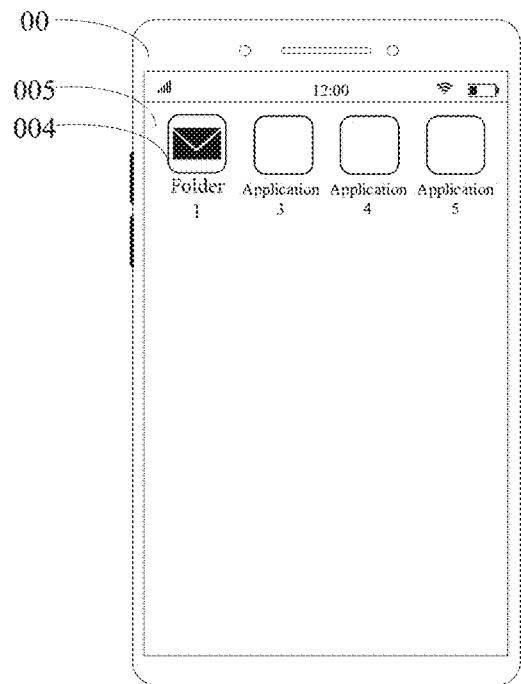
FIGS. 10A-10C are first schematic diagrams of an operation of displaying an interface of an application by an electronic device according to an embodiment of the present disclosure.
Figure 10B:
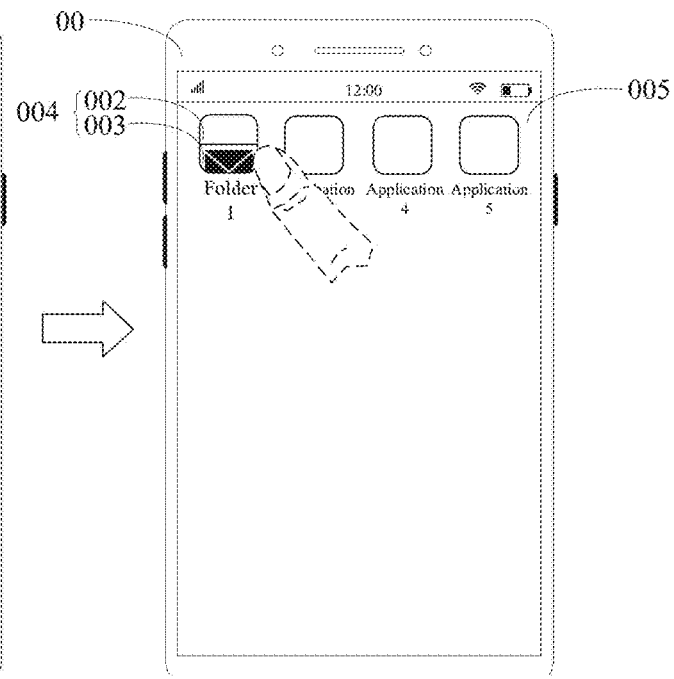
Figure 10C:
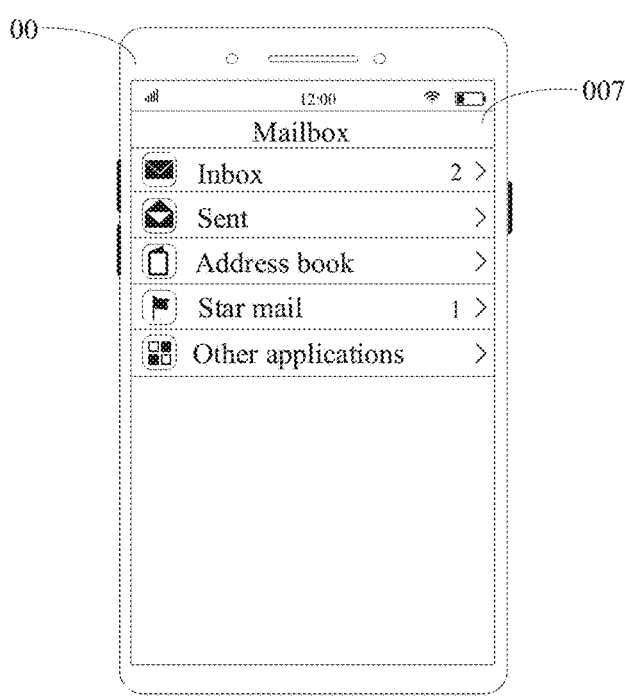

For example, FIGS. 10A-10C are first schematic diagrams of an operation of displaying an interface of an application by the electronic device. As shown in FIG. 10A, in a case that a tilt angle of an electronic device 00 is zero degrees, four icons: a "folder 1", an "application 3", an "application 4", and an "application 5" are displayed on a desktop interface 005 of an electronic device 00. The folder 1 includes an icon of the application 1 and an icon of the application 2 (that is, two first icons), and a cover icon of the folder 1 is the icon of the application 2. If the user adjusts the tilt angle of the electronic device 00 to 45°, as shown in FIG. 10B, the electronic device 00 may display, according to the tilt angle of the electronic device 00 in response to an input of adjusting the tilt angle of the electronic device 00 (that is, a first input), an icon 002 of the application 1 and an icon 003 of the application 2 in a region in which an icon 004 of the "folder 1" is located (that is, a target region). The user may tap the icon 003 of the application 2 twice (that is, a target icon), and as shown in FIG. 10C, the electronic device 00 may display an interface 007 of the application 2 (that is, a mailbox application) in response to the double-tap input (that is, a second input), that is, display a main interface 007 of the mailbox.

Scenario 2

For example, in this embodiment of the present disclosure, in a case that the second icon is an icon of an application, the target icon may be an icon of a sub-page in the application indicated by the second icon. In some embodiments, in a case that the icon of the target application is displayed in the region in which the second icon is located, the user may adjust the tilt angle of the electronic device through the first input, and the electronic device may display icons of N sub-pages in the target application (that is, the N first icons) in the target region according to the tilt angle of the electronic device in response to the first input. The electronic device may further receive a second input performed on a target icon in the icons of the N sub-pages, and display, in response to the second input, an interface of a sub-page in the target application indicated by the target icon.

Figure 11A:
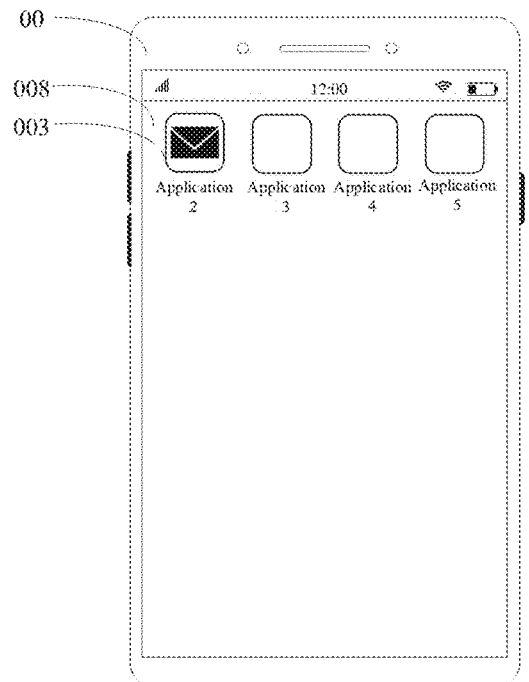
FIGS. 11A-11C are second schematic diagrams of an operation of displaying an interface of an application by an electronic device according to an embodiment of the present disclosure.
Figure 11B:
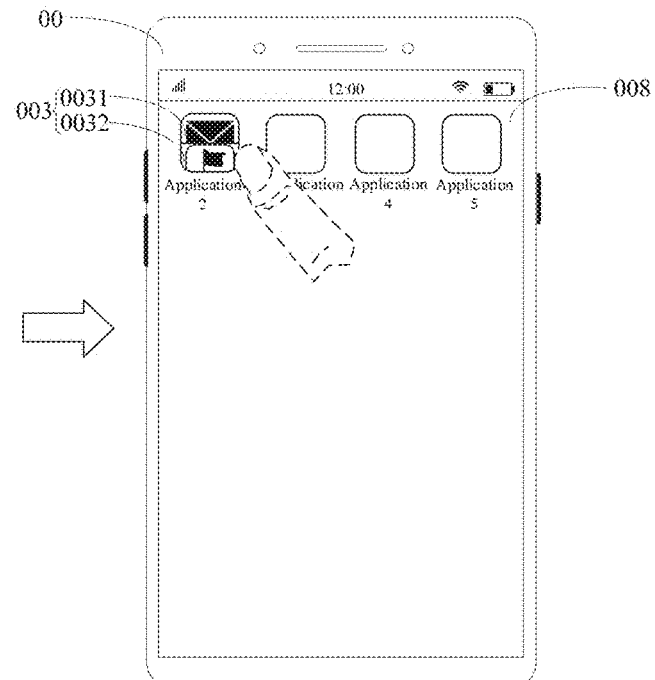
Figure 11C:
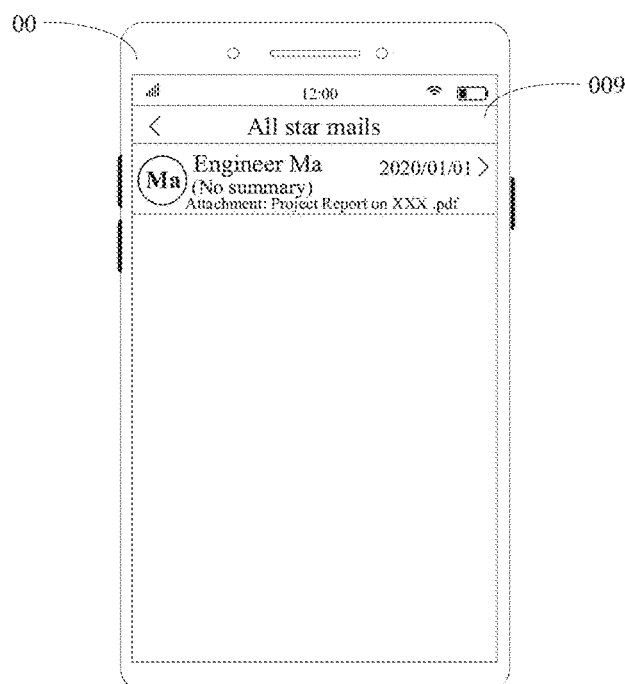

For example, FIGS. 11A-11C are second schematic diagrams of an operation of displaying an interface of an application by the electronic device. As shown in FIG. 11A, in a case that a tilt angle of an electronic device 00 is zero degrees, four icons: an "application 2", an "application 3", an "application 4", and an "application 5" are displayed on a desktop interface 008 of the electronic device 00, where an icon of the application 2 is 003. If the user adjusts the tilt angle of the electronic device 00 to 45°, as shown in FIG. 11B, the electronic device 00 may display a first sub-icon 0031 of the application 2 and a second sub-icon 0032 of the application 2 on the icon 003 of the application 2 according to the tilt angle of the electronic device 00 in response to an input of adjusting the tilt angle of the electronic device 00 (that is, a first input), where the first sub-icon 0031 is used to indicate an inbox interface of the application 2, and the second sub-icon 0032 is used to indicate a start mail interface of the application 2. The user may tap the second sub-icon 0032, and as shown in FIG. 11C, the electronic device 00 may display a start mail interface 009 of the application 2 (that is, a mailbox application) in response to the tap input (that is, a second input).

An embodiment of the present disclosure displays a display method In a case that K icons (K is a positive integer) are displayed, an electronic device may receive a first input through which a user adjusts a tilt angle of the electronic device, and display N first icons in a target region according to the tilt angle of the electronic device in response to the first input, where the target region is any one of the following: a region in which a second icon in the K icons is located and a region in which a distance from the second icon in the K icons is less than or equal to a preset value, the N first icons are associated with the second icon, and N is a positive integer. A second input performed on a target icon in the N first icons is received, and an interface of an application indicated by the target icon is displayed in response to the second input. According to this solution, if the user wants to start the application indicated by the target icon, the user may tilt the electronic device, so that the electronic device can display, according to the tilt angle of the electronic device, the N first icons associated with the second icon in the target region. Then the user may trigger, through an input performed on the target icon in the N first icons, the electronic device to display the interface of the application corresponding to the target icon. In this way, compared with the related art, in this solution, an operation process of searching for a target icon by the user may be simplified, thereby improving human-computer interaction performance.

For example, in a case that the electronic device partially displays the target icon in the target region, the user may trigger, through one input, the electronic device to display the entire target icon.

Figure 12:
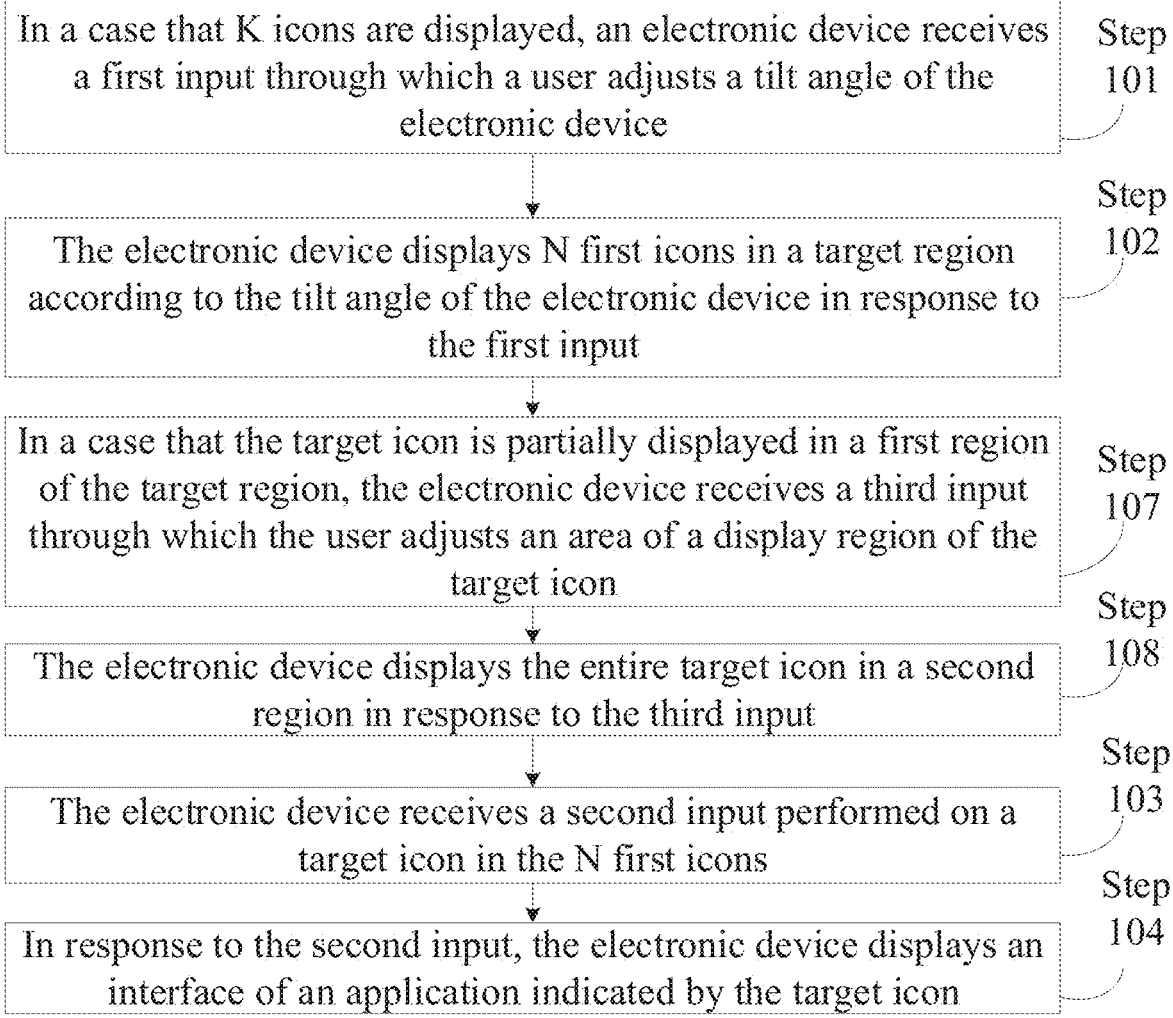
FIG. 12 is a fourth schematic diagram of a display method according to an embodiment of the present disclosure.
Figure 13:
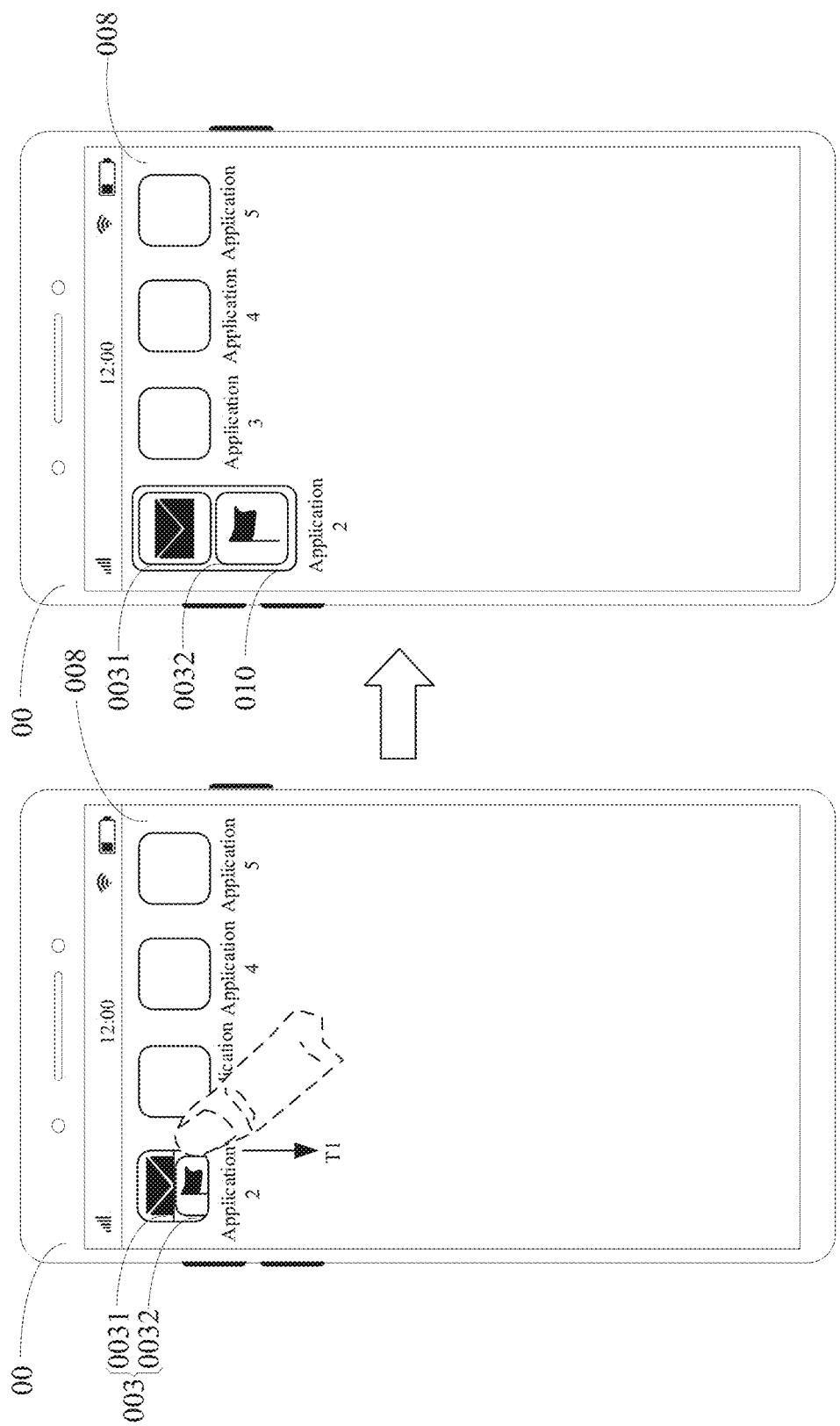
FIGS. 13A and 13B are schematic diagrams of an operation of displaying an entire target icon by an electronic device according to an embodiment of the present disclosure.

For example, with reference to FIG. 2, as shown in FIG. 12, before step 103, the display method provided in this embodiment of the present disclosure may further include the following step 107 and step 108.

Step 107: in a case that the target icon is partially displayed in a first region of the target region, the electronic device receives a third input through which the user adjusts an area of a display region of the target icon.

It should be noted that in this embodiment of the present disclosure, for specific descriptions of the target region, refer to the related descriptions in the foregoing Step 102. Details are not described herein again. The following embodiment uses an example in which the target region is the region in which the second icon is located for description, which does not constitute a limitation on this embodiment of the present disclosure.

In addition, in this embodiment of the present disclosure, that the target icon is partially displayed in the first region of the target region means that the target icon is not completely displayed in the region in which the second icon is located or a first region in the region in which the distance from the second icon is less than or equal to the preset value, that is, only a part of the target icon can be displayed.

For example, in this embodiment of the present disclosure, the third input may be a touch input, a voice input, a preset gesture input, or the like on the target region. The touch input may be at least one of the following: a slide input on the target region, a drag input on the target region, a long-press input on the target region, and the like. The preset gesture input may be a preset gesture that may be used to adjust an area change of the target region. In some embodiments, this may be determined according to an actual use requirement, and is not specifically limited in this embodiment of the present disclosure.

In some embodiments, in a case that the electronic device displays the target region, if the user adjusts the area of the display region of the target icon by dragging an edge of the target region, the drag input is the third input; if the user controls the area of the display region of the target icon through a voice input, the voice input is the third input; or if the user adjusts the area of the display region of the target icon through a "YES" gesture or an "OK" gesture on a camera of the electronic device (where the preset gesture "YES" is used to control the electronic device to increase the area of the display region of the target icon, and the preset gesture "OK" is used to control the electronic device to reduce the area of the display region of the target icon), the gesture input is the third input.

Step 108: The electronic device displays the entire target icon in a second region in response to the third input.

The second region includes the first region.

It should be noted that the second region may be located within the target region, or may be located outside the target region, and an area of the second region is greater than or equal to an area of the first region.

In addition, in this embodiment of the present disclosure, the entire target icons is an entirety of the target icon displayed by the electronic device, that is, the user may view the entire target icon displayed in the second region of the electronic device, instead of a part of the target icon.

For example, FIGS. 13A and 13B are schematic diagrams of an operation of displaying the entire target icon by the electronic device. As shown in FIG. 13A, four icons: an "application 2", an "application 3", an "application 4", and an "application 5" are displayed on a desktop interface 008 of an electronic device 00, where a first sub-icon 0031 of the application 2 and a second sub-icon 0032 of the application 2 are partially displayed in a region in which an icon 003 of the application 2 is located (that is, a first region). If the user wants to operate the second sub-icon 0032 of the application 2, the user may drag the second sub-icon 0032 of the application 2 in a T1 direction, and as shown in FIG. 13B, the electronic device 00 may display the entire first sub-icon 0031 of the application 2 and the entire second sub-icon 0032 of the application 2 in a region 010 (that is, a second region) in response to the drag input (that is, a third input), where an area of the region 010 is greater than an area of the region in which the icon 003 is located.

It can be understood that, in this embodiment of the present disclosure, in a case that the target icon is partially displayed in the first region of the target region, the user may adjust the area of the display region of the target icon through the third input, and the electronic device may display, in response to the third input, the entire target icon in the second region whose area is greater than or equal to that of the first region. That is, in a case that the user needs to operate the target icon, and only a part of the target icon is displayed, the user may adjust display of the target icon through an input, so that the electronic device displays the entire target icon, and it is convenient for the user to operate the target icon, thereby improving user experience.

For example, when the electronic device displays M third icons in the target region, the user may trigger, through an input, the electronic device to adjust icons displayed in the target region (for example, the electronic device updates the M third icons to the N first icons, or displays the M third icons and the N first icons in the target region).

Figure 14:
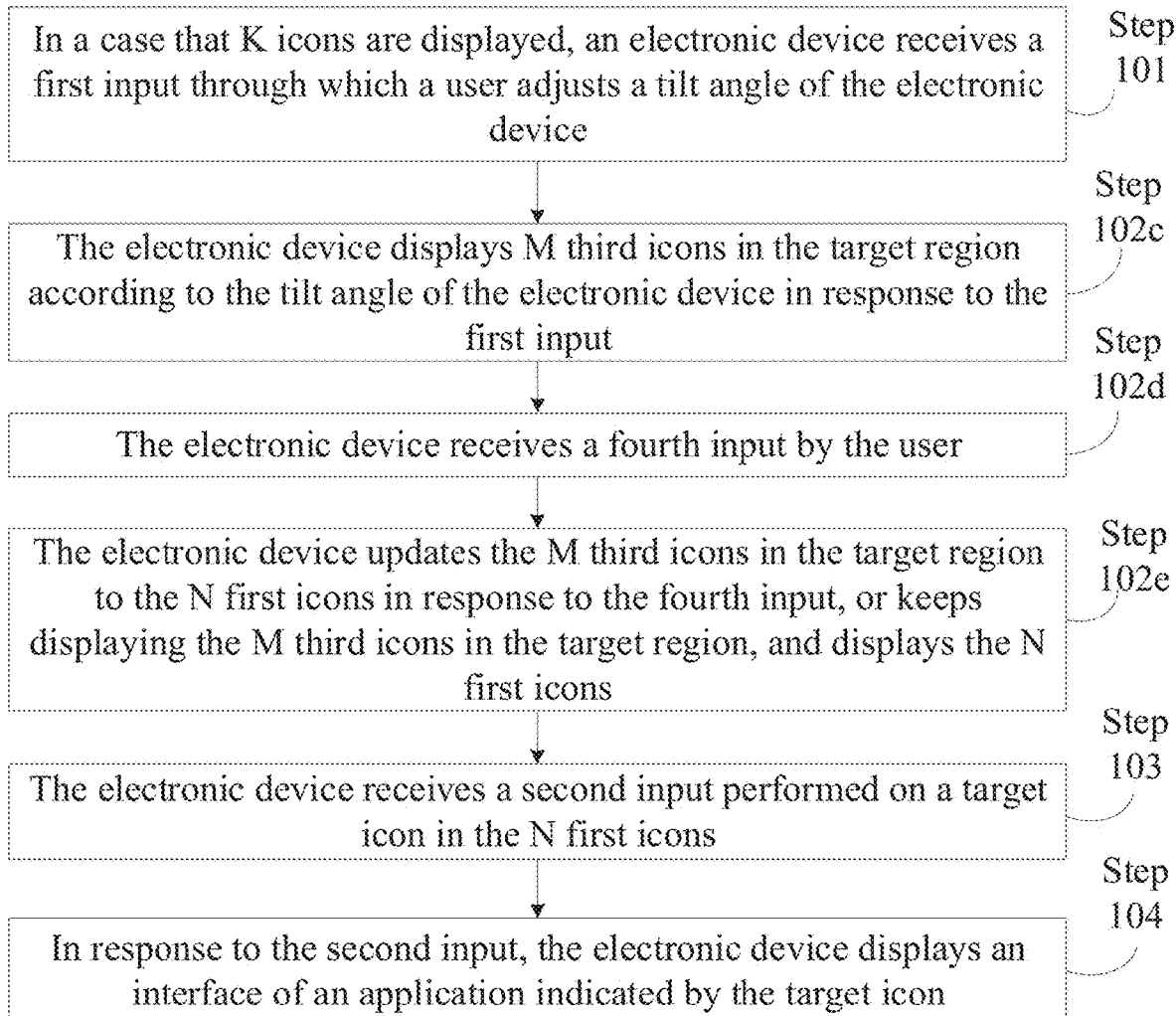
FIG. 14 is a fifth schematic diagram of a display method according to an embodiment of the present disclosure.
Figure 15:
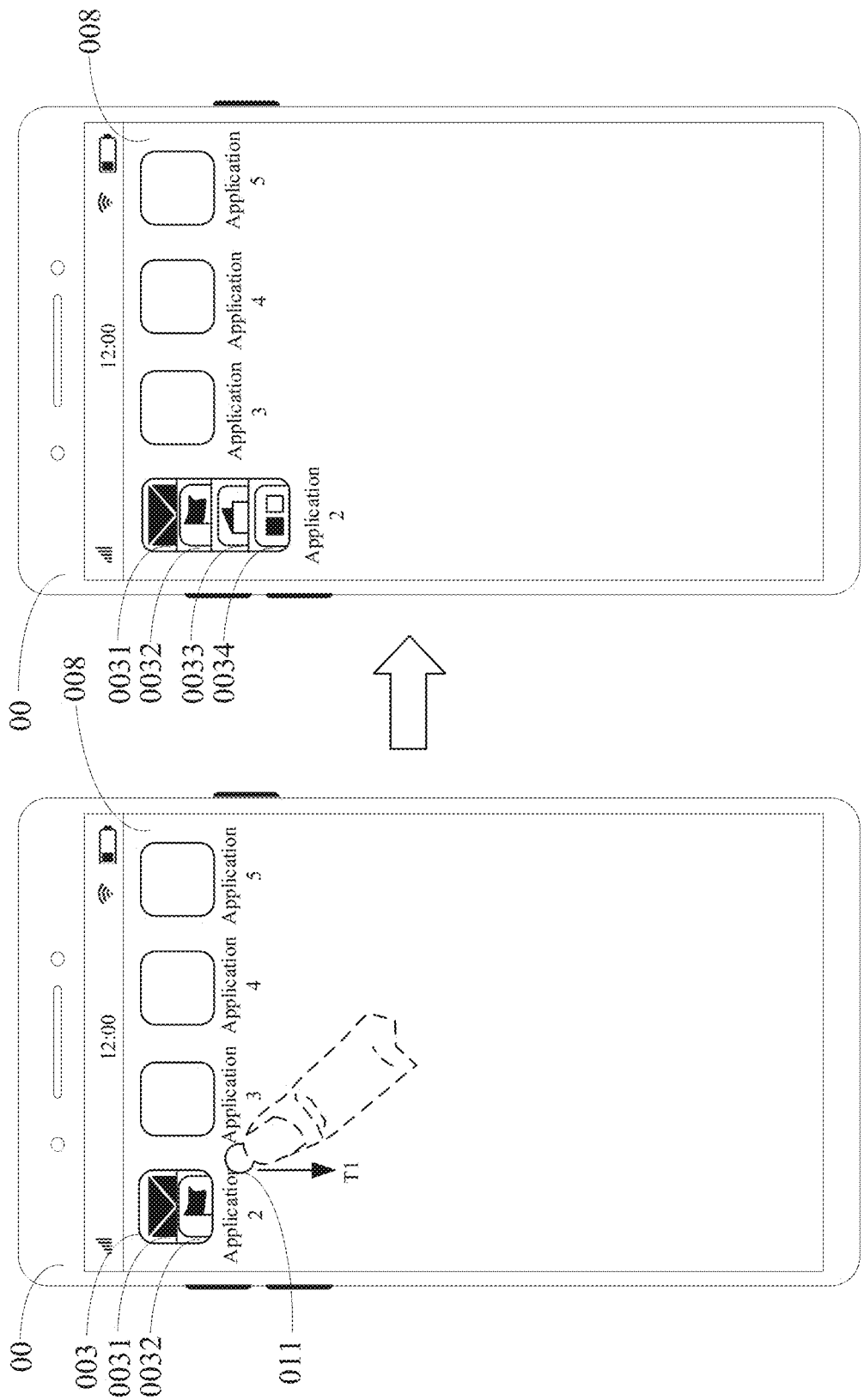
FIGS. 15A and 15B are first schematic diagrams of an operation of displaying an icon in a target region by an electronic device according to an embodiment of the present disclosure.
Figure 16:
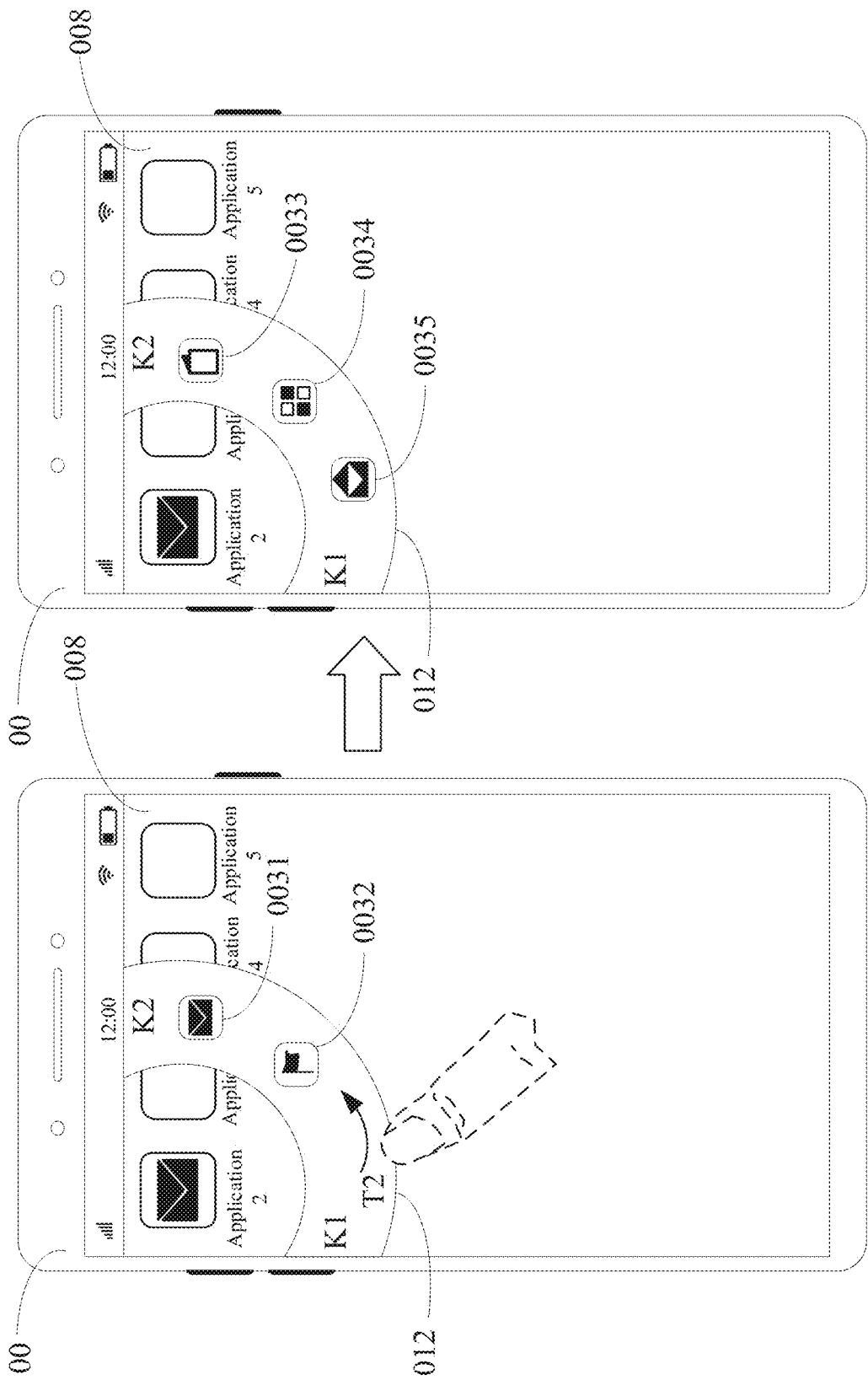
FIGS. 16A and 16B are second schematic diagrams of an operation of displaying an icon in a target region by an electronic device according to an embodiment of the present disclosure.

For example, with reference to FIG. 2, as shown in FIG. 14, step 102 may be implemented by using the following steps 102c to 102e.

Step 102c: The electronic device displays M third icons in the target region according to the tilt angle of the electronic device in response to the first input.

M is a positive integer.

For example, in this embodiment of the present disclosure, a size relationship between M and N is not specifically limited in this embodiment of the present disclosure, that is, M may be greater than N, M may be equal to N, or M may be less than N, In some embodiments, this may be determined according to an actual requirement.

For example, in this embodiment of the present disclosure, M is a preset value. In some embodiments, the specific value of M may be set according to a size of the screen of the electronic device, a size of an icon displayed on the screen of the electronic device, a personal preference of the user, or the like. In some embodiments, this may be determined according to an actual use requirement, and is not specifically limited in this embodiment of the present disclosure.

Step 102d: The electronic device receives a fourth input performed by the user.

For example, in this embodiment of the present disclosure, the fourth input may be a gesture input on the electronic device, an input on a physical button of the electronic device, or a touch input on a display control of the electronic device. In some embodiments, a gesture of the gesture input may be a first preset gesture, and the first preset gesture may be used to instruct the electronic device to update display of the first icon. The input on the physical button may be an input on a volume button of the electronic device, and the volume button may be used to instruct the electronic device to update the M third icons to the N first icons, or display the M third icons and the N first icons. The touch input may be a slide input, a drag input, a rotation input in a preset direction, or the like on the display control of the electronic device. The display control may be configured to control the electronic device to update the M third icons in the target region to the N first icons, or display the M third icons and the N first icons. In some embodiments, this may be determined according to an actual use requirement, and is not specifically limited in this embodiment of the present disclosure.

Step 102e: The electronic device updates the M third icons in the target region to the N first icons in response to the fourth input, or keeps displaying the M third icons in the target region, and displays the N first icons.

The second icon is an icon of a target folder, and the M third icons are icons in the target folder; or the second icon is an icon of a target application, and each of the M third icons is used to indicate a sub-page in the target application.

It should be noted that, in this embodiment of the present disclosure, the electronic device updates display of the first icon in two manners in response to the fourth input, and the user may select and execute one of the two manners according to an actual use requirement. Manner 01: The electronic device cancels display of the M third icons in the target region, and displays the N first icons. In this case, a total of N icons (that is, the N first icons) are displayed in the target region of the electronic device. Manner 02: The electronic device keeps displaying the M third icons in the target region, and displays the N first icons. In this case, a total of (M+N) icons are displayed in the target region of the electronic device.

For example, in this embodiment of the present disclosure, after steps 102d and 102e are performed, if an icon required by the user is still not displayed in the target region, the user may trigger the electronic device to perform steps 102d and 102e for a plurality of times, until icons displayed in the target region include the icon required by the user.

For example, FIGS. 15A and 15B are first schematic diagrams of an operation of displaying an icon in the target region of the electronic device. As shown in FIG. 15A, four icons: an "application 2", an "application 3", an "application 4", and an "application 5" are displayed on a desktop interface 008 of an electronic device 00, where a first sub-icon 0031 of the application 2 and a second sub-icon 0032 of the application 2 (that is, two third icons) are displayed in a region in which an icon 003 of the application 2 is located (that is, a target region). The user may drag a display control 011 in a T1 direction, and as shown in FIG. 15B, the electronic device 00 may keep displaying, in response to the drag input (that is, a fourth input), the first sub-icon 0031 of the application 2 and the second sub-icon 0032 of the application 2 (that is, two third icons) in the region in which the icon 003 is located, and display a third sub-icon 0033 of the application 2 and a fourth sub-icon 0034 of the application 2 (that is, two first icons).

For example, FIGS. 16A and 16B are second schematic diagrams of an operation of displaying an icon in the target region of the electronic device. As shown in FIG. 16A, four icons: an "application 2", an "application 3", an "application 4", and an "application 5" are displayed on a desktop interface 008 of an electronic device 00, where a first control 012 is displayed on a region in which a distance from an icon of the application 2 is preset value (that is, a target region), and a first sub-icon 0031 of the application 2 and a second sub-icon 0032 of the application 2 (that is, two third icons) are displayed on the first control 012. The user may perform a slide input in a T2 direction, and as shown in FIG. 16B, the electronic device 00 may move the first sub-icon 0031 of the application 2 and the second sub-icon 0032 of the application 2 along a K2 end for display in response to the slide input (that is, a fourth input), and move a third icon 0033 of the application 2, a fourth icon 0034 of the application 2, and a fifth icon 0035 of the application 2 (that is, three first icons) in a T2 direction along a K1 end for display on the first control 0012.

It can be understood that, in this embodiment of the present disclosure, the electronic device may adjust, by receiving an input of the user, an icon displayed in the target region. The electronic device may display a small quantity of icons in the target region, to prevent display of too many icons from affecting another function of using the electronic device by the user. In addition, the user may adjust, through an input, the target region to display different icons, so that the user can quickly find an icon required by the user, thereby improving human-computer interaction performance of the electronic device.

It should be noted that, in the embodiments of the present disclosure, the display methods shown in the foregoing accompanying drawings are described by using an example with reference to one of the accompanying drawings in the embodiments of the present disclosure. In specific implementation, the display methods shown in the foregoing accompanying drawings may be further implemented with reference to any other accompanying drawings that may be combined shown in the foregoing embodiments. Details are not described herein again.

Figure 17:
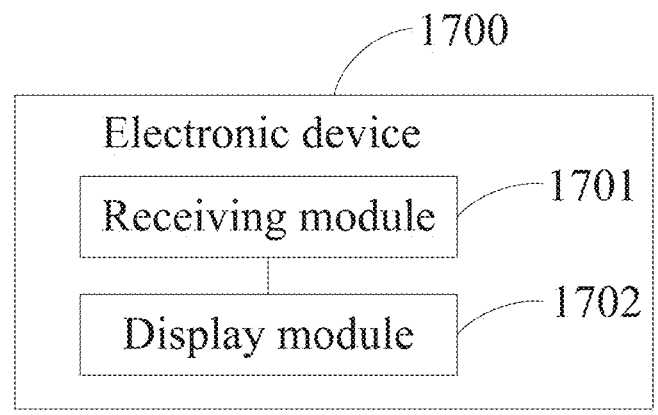
FIG. 17 is a first schematic structural diagram of an electronic device according to an embodiment of the present disclosure.

As shown in FIG. 17, an embodiment of the present disclosure provides an electronic device 1700. The electronic device may include a receiving module 1701 and a display module 1702. The receiving module 1701 may be configured to: in a case that K icons are displayed, receive a first input through which a user adjusts a tilt angle of an electronic device, where K is a positive integer. The display module 1702 may be configured to display N first icons in a target region according to the tilt angle of the electronic device in response to the first input received by the receiving module 1701, where the target region is any one of the following: a region in which a second icon in the K icons is located and a region in which a distance from the second icon in the K icons is less than or equal to a preset value, the N first icons are associated with the second icon, and N is a positive integer. The receiving module 1701 may be further configured to receive a second input performed on a target icon in the N first icons. The display module 1702 may be further configured to: in response to the second input received by the receiving module 1701, display an interface of an application indicated by the target icon.

Figure 18:
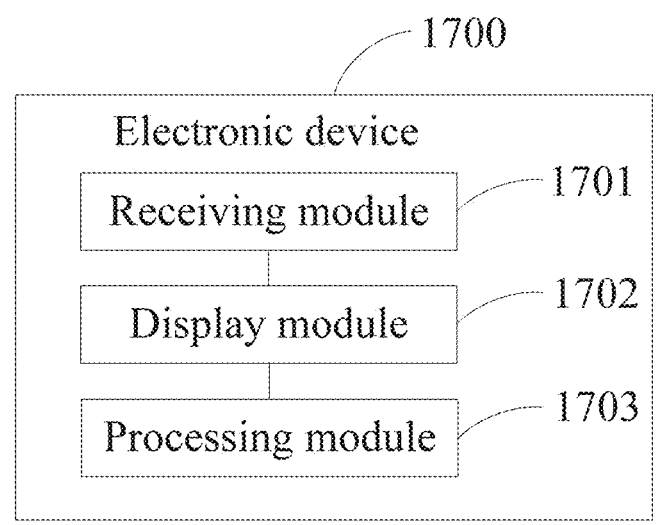
FIG. 18 is a second schematic structural diagram of an electronic device according to an embodiment of the present disclosure.

For example, with reference to FIG. 17, as shown in FIG. 18, the electronic device provided in this embodiment of the present disclosure may further include a processing module 1703. The processing module 1703 may be configured to: in a case that the tilt angle of the electronic device is within a target angle interval, determine display parameters corresponding to the target angle interval as display parameters of the N first icons. The display module 1702 may be configured to display the N first icons in the target region according to the display parameters of the N first icons. The display parameters of the N first icons include at least any one of an arrangement pattern of each first icon in the region in which the second icon is located, a proportion of each first icon in the region in which the second icon is located, a position of each first icon in a region in which a distance from the second icon is less than or equal to a preset value, and a display proportion of each first icon in the region in which the distance from the second icon is less than or equal to the preset value.

For example, in this embodiment of the present disclosure, the receiving module 1701 may be further configured to: in a case that the target icon is partially displayed in a first region of the target region, receive a third input through which the user adjusts an area of a display region of the target icon. The display module 1702 may be further configured to display the entire target icon in a second region in response to the third input received by the receiving module 1701, where the second region includes the first region.

For example, in this embodiment of the present disclosure, the display module 1702 may be further configured to display M third icons in the target region according to the tilt angle of the electronic device, where M is a positive integer. The receiving module 1701 may be further configured to receive a fourth input performed by the user. The display module 1702 may be configured to: update the M third icons in the target region to the N first icons in response to the fourth input received by the receiving module 1701; or keep displaying the M third icons in the target region, and display the N first icons. The second icon is an icon of a target folder, and the M third icons are icons in the target folder; or the second icon is an icon of a target application, and each of the M third icons is used to indicate a sub-page in the target application.

For example, in this embodiment of the present disclosure, the second icon is the icon of the target folder, and the N first icons are icons in the target folder; or the second icon is the icon of the target application, and each of the N first icons is used to indicate a sub-page in the target application.

The electronic device provided in this embodiment of the present disclosure can implement the processes implemented by the electronic device in the foregoing method embodiment. To avoid repetition, details are not described herein again.

According to the electronic device provided in this embodiment of the present disclosure, if the user wants to start the application indicated by the target icon, the user may tilt the electronic device, so that the electronic device can display, according to the tilt angle of the electronic device, the N first icons associated with the second icon in the target region. Then the user may trigger, through an input performed on the target icon in the N first icons, the electronic device to display the interface of the application corresponding to the target icon. In this way, compared with the related art, in this solution, an operation process of searching for a target icon by the user may be simplified, thereby improving human-computer interaction performance.

Figure 19:
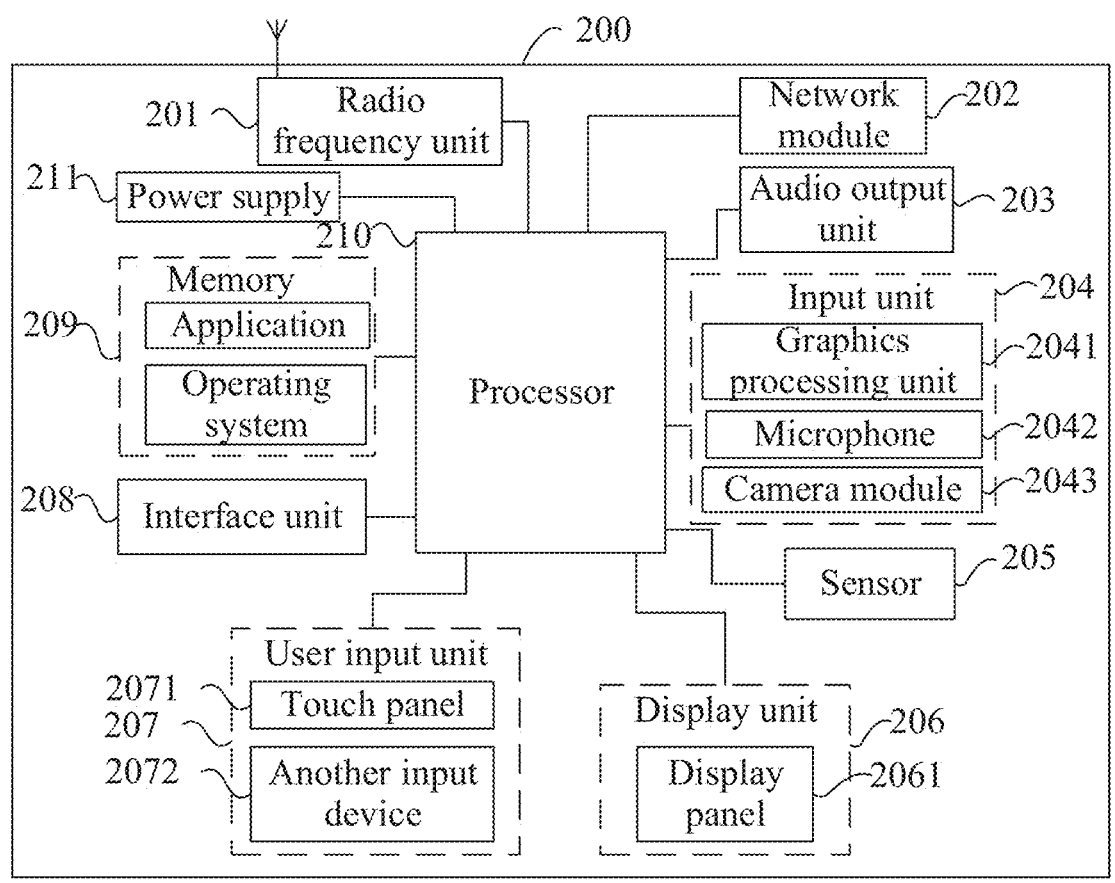
FIG. 19 is a schematic diagram of hardware of an electronic device according to an embodiment of the present disclosure.

FIG. 19 is a schematic structural diagram of hardware of an electronic device according to the embodiments of the present disclosure. As shown in FIG. 19, an electronic device 200 includes but is not limited to components such as a radio frequency unit 201, a network module 202, an audio output unit 203, an input unit 204, a sensor 205 a display unit 206, a user input unit 207, an interface unit 208, a memory 209, a processor 210, and a power supply 211. A person skilled in the art may understand that a structure of the electronic device shown in FIG. 19 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle electronic device, a wearable device, a pedometer, and the like.

The user input unit 207 may be configured to: in a case that K icons are displayed, receive a first input through which a user adjusts a tilt angle of an electronic device, where K is a positive integer. The display unit 206 may be configured to display N first icons in a target region according to the tilt angle of the electronic device in response to the first input received by the user input unit 207, where the target region is any one of the following: a region in which a second icon in the K icons is located and a region in which a distance from the second icon in the K icons is less than or equal to a preset value, the N first icons are associated with the second icon, and N is a positive integer. The user input unit 207 may be further configured to receive a second input performed on a target icon in the N first icons. The display unit 206 may be further configured to: in response to the second input received by the user input unit 207, display an interface of an application indicated by the target icon.

According to the electronic device provided in this embodiment of the present disclosure, if the user wants to start the application indicated by the target icon, the user may tilt the electronic device, so that the electronic device can display, according to the tilt angle of the electronic device, the N first icons associated with the second icon in the target region. Then the user may trigger, through an input performed on the target icon in the N first icons, the electronic device to display the interface of the application corresponding to the target icon. In this way, compared with the related art, in this solution, an operation process of searching for a target icon by the user may be simplified, thereby improving human-computer interaction performance.

It should be understood that, in this embodiment of the present disclosure, the radio frequency unit 201 may be configured to receive and send information or a signal in a call process. In some embodiments, after receiving downlink data from a base station, the radio frequency unit 201 sends the downlink data to the processor 210 for processing. In addition, the radio frequency unit 201 sends uplink data to the base station. Usually, the radio frequency unit 201 includes but is not limited to an antenna, at least one amplifier, a transceiver, a coupler, a low noise amplifier, a duplexer, and the like. In addition, the radio frequency unit 201 may communicate with a network and another device through a wireless communication system.

The electronic device provides wireless broadband Internet access for the user by using the network module 202, for example, helping the user to send and receive an e-mail, brows a web page, and access streaming media.

The audio output unit 203 may convert audio data received by the radio frequency unit 201 or the network module 202 or stored in the memory 209 into an audio signal and output the audio signal as a sound. In addition, the audio output unit 203 may further provide an audio output (for example, a call signal received voice, or a message received voice) related to a specific function implemented by the electronic device 200. The audio output unit 203 includes a speaker, a buzzer, a telephone receiver, and the like.

The input unit 204 is configured to receive an audio signal or a video signal. The input unit 204 may include a Graphics Processing Unit (GPU) 2041, a microphone 2042, and a camera module 2043, and the graphics processing unit 2041 processes image data of a still picture or a video obtained by an image capture apparatus (such as a camera) in a video capture mode or an image capture mode. A processed image frame may be displayed on the display unit 206. The image frame processed by the graphics processing unit 2041 may be stored in the memory 209 (or another storage medium) or sent by using the radio frequency unit 201 or the network module 202. The microphone 2042 may receive a sound and can process such sound into audio data. Processed audio data may be converted, in a call mode, into a format that can be sent to a mobile communication base station by using the radio frequency unit 201 for output. The camera module 2043 collects an image, and transmits the collected image to the graphics processing unit 2041.

The electronic device 200 further includes at least one sensor 205 such as a light sensor, a motion sensor, and another sensor. In some embodiments, the light sensor includes an ambient light sensor and a proximity sensor. The ambient light sensor may adjust luminance of the display panel 2061 based on brightness of ambient light. The proximity sensor may turn off the display panel 2061 and/or backlight when the electronic device 200 moves to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 205 may further include a fingerprint sensor, a pressure sensor, an iris sensor, a molecular sensor, a gyroscope, a barometer, a hygrometer, a thermometer, an infrared sensor, and the like. Details are not described herein.

The display unit 206 is configured to display information entered by a user or information provided for a user. The display unit 206 may include a display panel 2061. The display panel 2061 may be configured in a form of a Liquid Crystal Display (LCD), an Organic Light-Emitting Diode (OLED), or the like.

The user input unit 207 may be configured to: receive entered digital or character information, and generate key signal input related to a user setting and function control of the electronic device. In some embodiments, the user input unit 207 includes a touch panel 2071 and another input device 2072. The touch panel 2071 is also referred to as a touchscreen, and may collect a touch operation performed by a user on or near the touch panel 2071 (such as an operation performed by a user on the touch panel 2071 or near the touch panel 2071 by using any proper object or accessory, such as a finger or a stylus). The touch panel 2071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 210, and can receive and execute a command sent by the processor 210. In addition, the touch panel 2071 may be of a resistive type, a capacitive type, an infrared type, a surface acoustic wave type, or the like. The user input unit 207 may include another input device 2072 in addition to the touch panel 2071. In some embodiments, the another input device 2072 may include but is not limited to a physical keyboard, a functional button (such as a volume control button or a power on/off button), a trackball, a mouse, and a joystick. Details are not described herein.

Further, the touch panel 2071 may cover the display panel 2061. When detecting the touch operation on or near the touch panel 2071, the touch panel 2071 transmits the touch operation to the processor 210 to determine a type of a touch event, and then the processor 210 provides corresponding visual output on the display panel 2061 based on the type of the touch event. In FIG. 19, although the touch panel 2071 and the display panel 2061 are used as two independent parts to implement input and output functions of the electronic device, in some embodiments, the touch panel 2071 and the display panel 2061 may be integrated to implement the input and output functions of the electronic device. This is not specifically limited herein.

The interface unit 208 is an interface for connecting an external apparatus with the electronic device 200, For example, the external apparatus may include a wired or wireless headphone port, an external power supply (or a battery charger) port, a wired or wireless data port, a storage card port, a port used to connect to an apparatus having an identity module, an audio Input/Output (I/O) port, a video I/O port, a headset port, and the like. The interface unit 208 may be configured to receive input (for example, data information and power) from an external apparatus and transmit the received input to one or more elements in the electronic device 200 or may be configured to transmit data between the electronic device 200 and an external apparatus.

The memory 209 may be configured to store a software program and various data. The memory 209 may mainly include a program storage region and a data storage region. The program storage region may store an operating system, an application required by at least one function (such as a sound play function or an image play function), and the like. The data storage region may store data (such as audio data or an address book) created based on use of the mobile phone, and the like. In addition, the memory 209 may include a high-speed random access memory, and may further include a nonvolatile memory, for example, at least one magnetic disk storage device, a flash storage device, or another volatile solid-state storage device.

The processor 210 is a control center of the electronic device, connects all parts of the entire electronic device by using various interfaces and lines, and performs various functions of the electronic device and data processing by running or executing a software program and/or a module that are/is stored in the memory 209 and by invoking data stored in the memory 209, to overall monitor the electronic device. The processor 210 may include one or more processing units. For example, an application processor and a modem processor may be integrated into the processor 210. The application processor mainly processes an operating system, a user interface, an application, and the like. The modem processor mainly processes wireless communications. It can be understood that, in some embodiments, the modem processor may not be integrated into the processor 210.

The electronic device 200 may further include the power supply 211 (such as a battery) that supplies power to each component. For example, the power supply 211 may be logically connected to the processor 210 by using a power supply management system, so as to implement functions such as charging and discharging management, and power consumption management by using the power supply management system.

In addition, the electronic device 200 includes some function modules not shown, and details are not described herein.

For example, an embodiment of the present disclosure further provides an electronic device, including the processor 210 and the memory 209 shown in FIG. 19, and a computer program that is stored in the memory 209 and that can be run on the processor 210. When the computer program is executed by the processor 210, the processes of the foregoing method. embodiment are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the processes of the foregoing method embodiment are implemented and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product, The computer software product is stored in a storage medium (such as a ROM/RAM, a hard disk, or an optical disc), and includes several instructions for instructing an electronic device (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A display method, wherein the method comprises:
when K icons are displayed on a user interface of an electronic device, receiving a first input through which a user adjusts a tilt angle of the electronic device, wherein the K icons comprise N first icons and a second icon, wherein the N first icons are associated with the second icon, wherein the N first icons each locates outside a region in which the second icon is located, wherein each of K and N is a positive integer;
according to a first tilt angle of the electronic device in response to the first input,
displaying the N first icons as cover icons in a target region, wherein the target region is the region in which the second icon is located, the second icon is an icon of a target folder, and the N first icons are icons representing the N first icons in the target folder, or
according to a second tilt angle of the electronic device in response to the first input, which is different with the first tilt angle, displaying the N first icons along with M third icons in the target region presented in a floating manner with a distance from the second icon less than or equal to a preset value, wherein the second icon is an icon of a target application, and each of the M third icons is used to indicate a sub-page in the target application;

receiving a second input performed on a target icon, wherein the target icon is one of the N first icons displayed as cover icons in the target folder in the target region, or the target region in the floating manner; and in response to the second input, displaying an interface of an application indicated by the target icon.

2. The method according to claim 1, wherein the displaying the N first icons as cover icons in a target region comprises:

when the tilt angle of the electronic device is within a target angle interval, determining display parameters corresponding to the target angle interval as display parameters of the N first icons; and displaying the N first icons as cover icons in the target region according to the display parameters of the N first icons, wherein the display parameters of the N first icons comprise at least any one of the following:

an arrangement pattern of each first icon in the region in which the second icon is located, a proportion of each first icon in the region in which the second icon is located, a position of each first icon in a floating region with the distance from the second icon less than or equal to a preset value, or a display proportion of each first icon in the floating region with the distance from the second icon less than or equal to the preset value.

3. The method according to claim 1, wherein before the receiving a second input performed on a target icon, the method further comprises:

when the target icon is partially displayed in a first region of the target region, receiving a third input through which the user adjusts an area of a display region of the target icon; and displaying the entire target icon in a second region in response to the third input, wherein the second region comprises the first region.

4. An electronic device, comprising:

a memory storing computer-readable instructions;

a processor coupled to the memory and configured to execute the computer-readable instructions, wherein the computer-readable instructions, when executed by the processor, cause the processor to perform operations comprising:

when K icons are displayed on a user interface of an electronic device, receiving a first input through which a user adjusts a tilt angle of the electronic device, wherein the K icons comprise N first icons and a second icon, wherein the N first icons are associated with the second icon, wherein the N first icons each locates outside a region in which the second icon is located, wherein each of K and N is a positive integer;

according to a first tilt angle of the electronic device in response to the first input, displaying the N first icons as cover icons in a target region, wherein the target region is the region in which the second icon is located, the second icon is an icon of a target folder, and the N first icons are icons representing the N first icons in the target folder, or according to a second tilt angle of the electronic device in response to the first input, which is different with the first tilt angle, displaying the N first icons along with M third icons in the target region presented in a floating manner with a distance from the second icon less than or equal to a preset value, wherein the second icon is an icon of a target application, and each of the M third icons is used to indicate a sub-page in the target application;

receiving a second input performed on a target icon, wherein the target icon is one of the N first icons displayed as cover icons in the target folder in the target region, or the target region in the floating manner; and in response to the second input, displaying an interface of an application indicated by the target icon.

5. The electronic device according to claim 4, wherein the displaying the N first icons as cover icons in a target region comprises:

when the tilt angle of the electronic device is within a target angle interval, determining display parameters corresponding to the target angle interval as display parameters of the N first icons; and displaying the N first icons as cover icons in the target region according to the display parameters of the N first icons, wherein the display parameters of the N first icons comprise at least any one of the following:

an arrangement pattern of each first icon in the region in which the second icon is located, a proportion of each first icon in the region in which the second icon is located, a position of each first icon in a floating region with the distance from the second icon less than or equal to a preset value, or a display proportion of each first icon in the floating region with the distance from the second icon less than or equal to the preset value.

6. The electronic device according to claim 4, wherein before the receiving a second input performed on a target icon, the operations further comprise:

when the target icon is partially displayed in a first region of the target region, receiving a third input through which the user adjusts an area of a display region of the target icon; and displaying the entire target icon in a second region in response to the third input, wherein the second region comprises the first region.

7. A non-transitory computer-readable medium storing instructions that, when executed by a processor, cause the processor to perform operations comprising:

when K icons are displayed on a user interface of an electronic device, receiving a first input through which a user adjusts a tilt angle of the electronic device, wherein the K icons comprise N first icons and a second icon, wherein the N first icons are associated with the second icon, wherein the N first icons each locates outside a region in which the second icon is located, wherein each of K and N is a positive integer;

according to a first tilt angle of the electronic device in response to the first input, displaying the N first icons as cover icons in a target region, wherein the target region is the region in which the second icon is located, the second icon is an icon of a target folder, and the N first icons are icons representing the N first icons in the target folder, or according to a second tilt angle of the electronic device in response to the first input, which is different with the first tilt angle, displaying the N first icons along with M third icons in the target region presented in a floating manner with a distance from the second icon less than or equal to a preset value, wherein the second icon is an icon of a target application, and each of the M third icons is used to indicate a sub-page in the target application;

receiving a second input performed on a target icon, wherein the target icon is one of the N first icons displayed as cover icons in the target folder in the target region, or the target region in the floating manner; and in response to the second input, displaying an interface of an application indicated by the target icon.

8. The non-transitory computer-readable medium according to claim 7, wherein the displaying the N first icons as cover icons in a target region comprises:

when the tilt angle of the electronic device is within a target angle interval, determining display parameters corresponding to the target angle interval as display parameters of the N first icons; and displaying the N first icons as cover icons in the target region according to the display parameters of the N first icons, wherein the display parameters of the N first icons comprise at least any one of the following:

an arrangement pattern of each first icon in the region in which the second icon is located, a proportion of each first icon in the region in which the second icon is located, a position of each first icon in a floating region with the distance from the second icon less than or equal to a preset value, or a display proportion of each first icon in the floating region with the distance from the second icon less than or equal to the preset value.

9. The non-transitory computer-readable medium according to claim 7, wherein before the receiving a second input performed on a target icon, the operations further comprise:

when the target icon is partially displayed in a first region of the target region, receiving a third input through which the user adjusts an area of a display region of the target icon; and displaying the entire target icon in a second region in response to the third input, wherein the second region comprises the first region.

* * * * *